US010788655B2

(12) United States Patent
Mikami et al.

(10) Patent No.: US 10,788,655 B2
(45) Date of Patent: Sep. 29, 2020

(54) IRRADIATION DEVICE, LASER MICROSCOPE SYSTEM, IRRADIATION METHOD, AND LASER MICROSCOPE DETECTION METHOD

(71) Applicant: Japan Science and Technology Agency, Saitama (JP)

(72) Inventors: Hideharu Mikami, Tokyo (JP); Keisuke Goda, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 141 days.

(21) Appl. No.: 16/076,627

(22) PCT Filed: Feb. 9, 2017

(86) PCT No.: PCT/JP2017/004801
§ 371 (c)(1),
(2) Date: Aug. 8, 2018

(87) PCT Pub. No.: WO2017/138619
PCT Pub. Date: Aug. 17, 2017

(65) Prior Publication Data
US 2019/0041620 A1 Feb. 7, 2019

(30) Foreign Application Priority Data

Feb. 9, 2016 (JP) ................................ 2016-022607

(51) Int. Cl.
*G02B 21/00* (2006.01)
*G02B 21/06* (2006.01)
(Continued)

(52) U.S. Cl.
CPC ......... *G02B 21/06* (2013.01); *G02B 21/0056* (2013.01); *G02B 21/0068* (2013.01);
(Continued)

(58) Field of Classification Search
CPC ..................... G02B 21/0076; G01B 9/02003
See application file for complete search history.

(56) References Cited

U.S. PATENT DOCUMENTS 6,271,924 B1 * 8/2001 Ngoi ...................... G01B 11/14
356/489

FOREIGN PATENT DOCUMENTS

WO 2014/110290 A1 7/2014
WO 2014/147590 A1 9/2014

OTHER PUBLICATIONS

Field, Jeffrey J., et al., "Plane wave analysis of coherent holographic image reconstruction by phase transfer (CHIRPT)," Journal of the Optical Society of America, Optics, Image Science, and Vision, vol. 32, No. 11, Nov. 2015, 1084-7529/15/112156-13, copyright 2015 Optical Society of America.
(Continued)

*Primary Examiner* — Thanh Luu
(74) *Attorney, Agent, or Firm* — Fox Rothschild LLP; Robert J. Sacco; Carol E. Thorstad-Forsyth

(57) ABSTRACT

Provided are an irradiation device, a laser microscope system, an irradiation method, and a laser microscope detection method which can further widen a bandwidth of detection light as a multiplexed signal. Laser light beams are separated and enter a first AOD (24) and a second AOD (34) so that a plurality of first diffracted light beams and a plurality of second diffracted light beams with deflection angles and sizes of frequency shifts different from each other are generated. The first diffracted light beams and the second diffracted light beams are superposed by a beam splitter (19) so as to generate a plurality of interference light beams with beat frequencies different from each other. An objective lens (52) is formed by aligning a plurality of irradiation spots of interference light beam linearly in a main scanning direction and irradiates a sample (T) with the interference light beam.
(Continued)

The irradiation spot is moved by oscillation of a scanning mirror (47*a*) in a sub scanning direction orthogonal to the main scanning direction. Fluorescence emitted from the sample (T) by irradiation of each interference light beam is detected by a light detection unit (13).

18 Claims, 13 Drawing Sheets

(51) Int. Cl.
*G02F 1/11* (2006.01)
*G02F 1/33* (2006.01)

(52) U.S. Cl.
CPC ............ *G02B 21/0076* (2013.01); *G02F 1/11* (2013.01); *G02F 1/33* (2013.01); *G02F 2203/22* (2013.01)

(56) References Cited

OTHER PUBLICATIONS

Sanders, Jeffrey S., et al., "Imaging with frequency-modulated reticles," Optical Engineering/Nov. 1991/vol. 30 No. 11.
Mikami, Hideharu, et al., "Enhanced speed in fluorescence imaging using beat frequency multiplexing," Proc. of SPIE vol. 9720, 97200T-1, copyright 2016 SPIE; ccc code: 1605-7422/16/S18; doi: 10.1117/12.2211836.

\* cited by examiner

INTERFERENCE LIGHT BEAM

IRRADIATION DEVICE, LASER MICROSCOPE SYSTEM, IRRADIATION METHOD, AND LASER MICROSCOPE DETECTION METHOD

CROSS REFERENCE TO RELATED APPLICATION

The present application is the U.S. national Stage of PCT International Patent Application No. PCT/JP2017/004801 filed on Feb. 9, 2017, which claims priority to Japanese Patent Application No. 2016-022607 filed on Feb. 9, 2016. All of the aforementioned applications are incorporated herein by reference in their entireties.

TECHNICAL FIELD

The present invention relates to an irradiation device, a laser microscope system, an irradiation method, and a laser microscope detection method.

BACKGROUND ART

A laser microscope system using a confocal optical system is known. This laser microscope system collects a laser beam using an objective lens and irradiates a sample with the laser beam, and receives fluorescence or reflected light emitted from the sample with a photodetector via a collecting lens and a pin hole disposed at a focal position of the collecting lens. Then, by moving an irradiation position of the laser beam in two orthogonal directions, respectively, a sample surface is scanned.

On the other hand, a laser microscope system using a method called a FIRE (Fluorescence Imaging using Radiofrequency-tagged Emission) method is proposed in Patent Literature 1. This laser microscope system of the FIRE method includes a beam splitter which splits a laser beam to first and second laser beams, an acousto-optic deflector (hereinafter referred to as an AOD (Acousto-Optic Deflector)) which outputs a plurality of diffracted light beams with deflection angles and sizes of frequency shifts different from each other from the first laser beam, an acousto-optic frequency shifter (hereinafter referred to as an AOFS (Acousto-Optic Frequency Shifter)) which shifts a frequency of the second laser beam in order to lower a beat frequency by considering responsiveness of the photodetector and a response speed of fluorescence, a beam splitter which superposes the second laser beam from the AOFS and the plurality of diffracted light beams from the AOD and generates excitation light at an intensity that is modulated by a difference in the frequency between the diffracted light beam and the second laser beam (beat frequency), and an irradiation unit which irradiates the sample with the excitation light.

In the aforementioned laser microscope system of the FIRE method, the irradiation unit is formed by linearly aligning a plurality of irradiation spots of the excitation light and moves the plurality of irradiation spots in one direction. As a result, the sample surface can be scanned by one movement of the plurality of irradiation spots in the one direction. Fluorescence from a fluorescent substance in the sample is emitted from each portion of the sample corresponding to the irradiation spot. Then, the emitted fluorescence has its light intensity changed in accordance with a beat frequency of irradiated interference light beam and is modulated in accordance with distribution of the fluorescent substance in a sub scan line by the movement of the irradiation spot in the sub scanning direction. That is, the fluorescence is an optical signal obtained by modulating the intensity of a signal with the beat frequency of the irradiated interference light beam as a carrier frequency in accordance with the distribution of the fluorescent substance. A detection light which is a multiplexed signal obtained by superposing and multiplexing the plurality of optical signals from the irradiation spots is detected by a photodetector such as an electron multiplier or the like, and the distribution of the fluorescent substance in a movement region of each irradiation spot is calculated from the frequency spectrum so as to obtain an observation image.

CITATION LIST

Patent Literature

Patent Literature 1: International Publication No. 2014-110290

SUMMARY OF INVENTION

Technical Problem

In the FIRE method as described above, since the detection light (multiplexed signal) obtained by multiplexing a plurality of optical signals corresponding to each of the irradiation spots is detected, an upper limit of a bandwidth that can be occupied by one optical signal is equal to an interval between adjacent carrier frequencies, that is, an interval of the beat frequencies. On the other hand, an interval between the frequencies of a plurality of diffracted light beams output by an AOD is equal to a frequency interval of each driving signal (comb component) included in a comb signal and thus, the interval between the beat frequencies of the excitation light is equal to the frequency interval of the driving signal. Therefore, the bandwidth of the detection light is limited to a frequency width of the driving signal in which the AOD can be operated (hereinafter referred to as an operation band).

Moreover, the practical operation band of the AOD is approximately 100 MHz to 200 MHz, for example, which is not sufficient in some cases. Thus, if the moving speed of the irradiation spot is increased, for example, the bandwidth of each optical signal is widened and thus, the number of irradiation spots needs to be reduced or the bandwidth of the optical signal needs to be limited by cutting a high frequency component of each optical signal, whereby deterioration of spatial resolution or contrast is incurred, and an observation image is lowered. On the contrary, if an observation image with a high image quality is to be obtained, the moving speed of the plurality of irradiation spots needed to be lowered.

The present invention has been made in view of the foregoing, and an object of the invention is to provide an irradiation device, a laser microscope system, an irradiation method, and a laser microscope detection method which can further widen the bandwidth of the detection light as a multiplexed signal.

Solution to Problem

An irradiation device according to the invention includes: an interference light generation unit configured to generate a plurality of interference light beams with different beat frequencies by causing a plurality of first light beams with different frequencies and a plurality of second light beams with different frequencies to interfere with each other by different combinations of frequency differences between the plurality of first light beams and the plurality of second light beams; and an interference light irradiation unit configured to emit the plurality of interference light beams.

A laser microscope system according to the invention includes the irradiation device, and a photodetector for detecting detection light from a sample irradiated with the plurality of interference light beams.

An irradiation method according to the invention includes: a diffracted light generation step of generating a plurality of first light beams with different frequencies and a plurality of second light beams with different frequencies; an interference light generation step of generating a plurality of interference light beams with different beat frequencies by causing the plurality of first light beams and the plurality of second light beams to interfere with each other; and an irradiation step of emitting the plurality of interference light beams.

A laser microscope detection method according to the invention includes: a diffracted light generation step of generating a plurality of first light beams with different frequencies and a plurality of second light beams with different frequencies; an interference light generation step of generating a plurality of interference light beams with different beat frequencies by causing the plurality of first light beams and the plurality of second light beams to interfere with each other; an irradiation step of emitting the plurality of interference light beams; and a light detection step of detecting detection light from a sample irradiated with the plurality of interference light beams.

Advantageous Effects of Invention

According to the present invention, since the plurality of first light beams with different frequencies and the plurality of second light beams with different frequencies interfere with each other by different combinations of frequency differences so as to generate and emit a plurality of interference light beams, a bandwidth of the detection light as a multiplexed signal can be further widened. And since the bandwidth is widened, an obtaining speed of an observation image can be increased while an image quality of the observation image is maintained or the image quality of the observation image can be improved while the obtaining speed of the observation image is maintained, for example.

DESCRIPTION OF EMBODIMENTS

First Embodiment

Figure 1:
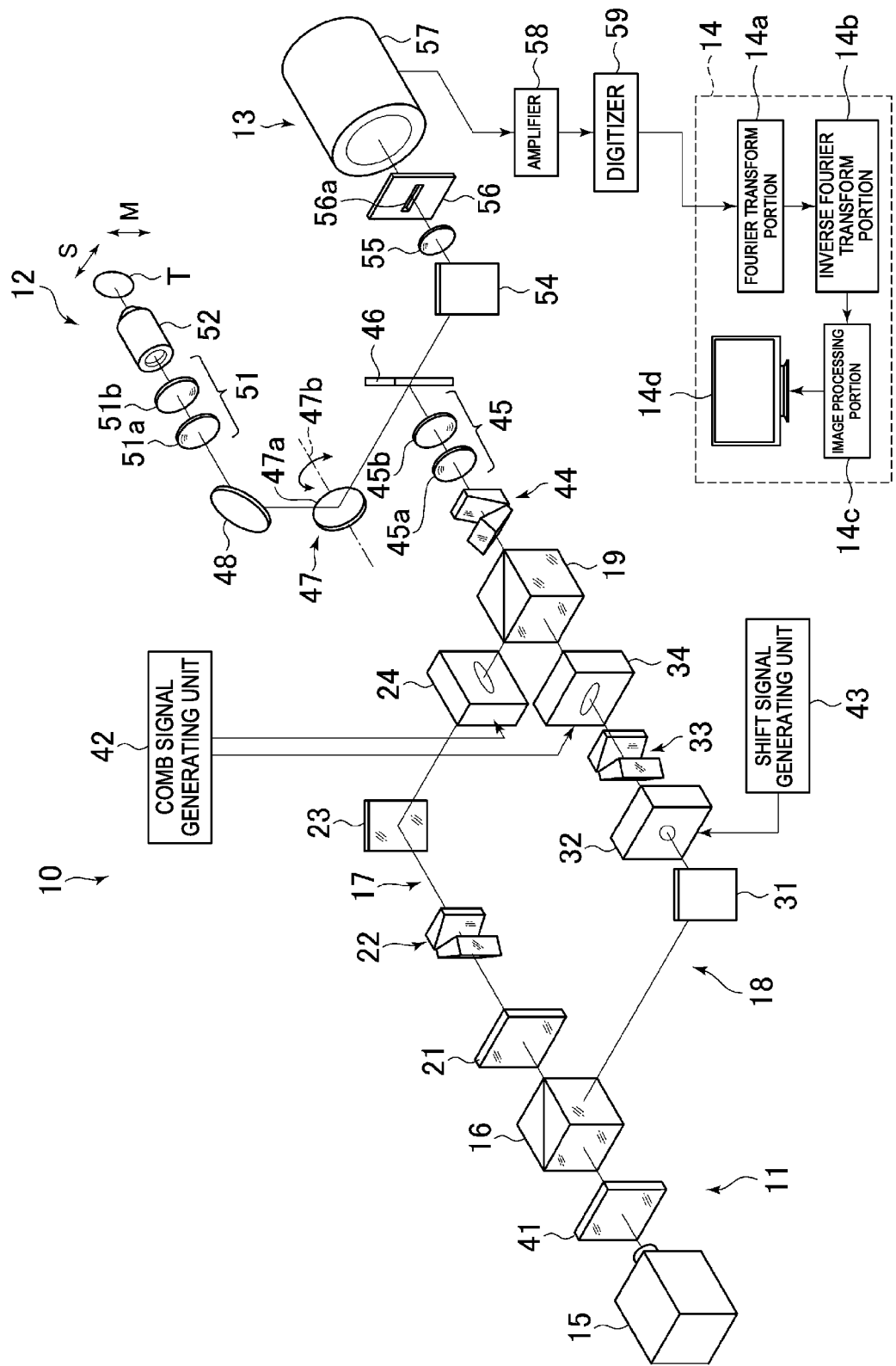
FIG. 1 is a schematic diagram illustrating configuration of a laser microscope system according to a first embodiment.

As illustrated in FIG. 1, a laser microscope system 10 in which the present invention is put into practice includes an interference light generation unit 11, an interference light irradiation unit 12, a light detection unit 13, and a signal processing unit 14. This laser microscope system 10 obtains an image of a sample T by irradiating the sample T with a plurality of interference light beams generated in the interference light generation unit 11 in a linearly aligned state in a main scanning direction (M direction) from the interference light irradiation unit 12. The laser microscope system 10 in this example obtains distribution of fluorescent substances in each sub scanning line by detecting fluorescence obtained by irradiating the sample T with the interference light beam as excitation light and emitted from the sample T by the light detection unit 13 and by processing the obtained detection signal by the signal processing unit 14 and generates an observation image for one frame illustrating the distribution of the fluorescent substances.

The interference light generation unit 11 constitutes an irradiation device together with the interference light irradiation unit 12. The interference light generation unit 11 is constituted by a laser device 15, a polarization beam splitter 16, first and second arms 17 and 18, a beam splitter 19 and the like. The first arm 17 as a first light generation unit is a unit for generating a plurality of first diffracted light beams as a plurality of first light beams with different frequencies and includes a ½ wavelength plate 21, an anamorphic prism pair 22, a mirror 23, and a first acousto-optic deflector (hereinafter referred to as an AOD (Acousto-Optic Deflector)) 24. The second arm 18 as a second light generation unit is a unit for generating a plurality of second diffracted light beams as a plurality of second light beams with different frequencies and includes a mirror 31, an acousto-optical frequency shifter (hereinafter referred to as an AOFS (Acousto-Optic Frequency Shifter) 32, an anamorphic prism pair 33, and a second AOD 34.

The laser beam from the laser device 15 as a laser beam source enters the polarization beam splitter 16 via a ½ wavelength plate 41. The laser device 15 is of a continuous oscillation type and continuously outputs a laser beam of linear polarization. In this example, a DPSS (Diode Pumped Solid State) laser outputting a laser beam with a wavelength of 491 nm is used as the laser device 15.

The polarization beam splitter 16 is provided as a light beam splitting unit which splits the laser beam from the laser device 15. This polarization beam splitter 16 transmits a part of the incident laser beam and outputs it as a first laser beam to a ½ wavelength plate 21 of the first arm 17 and reflects the remaining laser beam and outputs it to the mirror 31 of the second arm 18 as a second laser beam. This polarization beam splitter 16 transmits and reflects the laser beam at an intensity ratio according to a polarization direction of the laser beam. The polarization direction of the laser beam incident to the polarization beam splitter 16 can be adjusted by an azimuth of an optical axis of the ½ wavelength plate 41. As a result, by considering a loss in each laser beam in the first arm 17 and the second arm 18, the intensity ratio between the first laser beam and the second laser beam is adjusted. For example, the adjustment is made such that the light intensities of the first laser beam and the second laser beam incident to the first and second AODs 24 and 34 become equal. If the intensity ratio between the first laser beam and the second laser beam does not have to be adjusted, a half mirror or a beam splitter of a non-polarization type can be used as a light beam splitting unit instead of the polarization beam splitter 16, and the ½ wavelength plates 21 and 41 are not needed in this case.

Moreover, if the first diffracted light beam generated from the first laser beam and the second diffracted light beam generated from the second laser beam can be made to interfere with each other as will be described later, a laser device outputting the first laser beam and a laser device outputting the second laser beam may be provided separately.

In the first arm 17, the first laser beam from the polarization beam splitter 16 enters the first AOD 24 via the ½ wavelength plate 21, the anamorphic prism pair 22, and the mirror 23. The ½ wavelength plate 21 rotates the polarization direction of the first laser beam so as to match the polarization direction of the second laser beam.

The anamorphic prism pair 22 deforms a beam shape (sectional shape) of the first laser beam from a circular shape to an oval shape. This deformation is made by extending the beam shape along a diffraction direction (a direction in which a progressive wave advances in the AOD) of the first laser beam by the first AOD 24. As described above, by deforming the beam shape of the first laser beam, spread of each of the first diffracted light beams output from the first AOD 24 is suppressed, and deterioration of the resolution is prevented.

The first AOD 24 is driven by a first comb signal from a comb signal generating unit 42, and generates a plurality of first diffracted light beams (N beams of first diffracted light) by the diffraction from the first laser beam. Each of the first diffracted light beams from the first AOD 24 enters the beam splitter 19. The comb signal generating unit 42 is constituted by an arbitrary waveform generator, for example.

The first comb signal is obtained by superposing driving signals with a plurality of frequencies different from each other, and an input of the first comb signal causes the first AOD 24 to simultaneously output N beams of first diffracted light with different deflection angles. Moreover, the first AOD 24 increases the deflection angle of the first diffracted light beam in proportion to the frequency of the driving signal and shifts the frequency of the first diffracted light beam with respect to the first laser beam. This frequency shift increases or decreases the frequency of the first diffracted light beam only by the frequency of the driving signal with respect to the first laser beam. In this example, the first diffracted light beam with the frequency higher than the first laser beam only by the frequency of the driving signal is output from the first AOD 24. Therefore, the first diffracted light beam with the larger deflection angle has the higher frequency. The deflection angle is an angle formed by zero-order diffracted light beam and the first diffracted light beam. Moreover, the frequency of the first diffracted light beam may be lowered only by the frequency of the driving signal with respect to the first laser beam.

Figure 2:
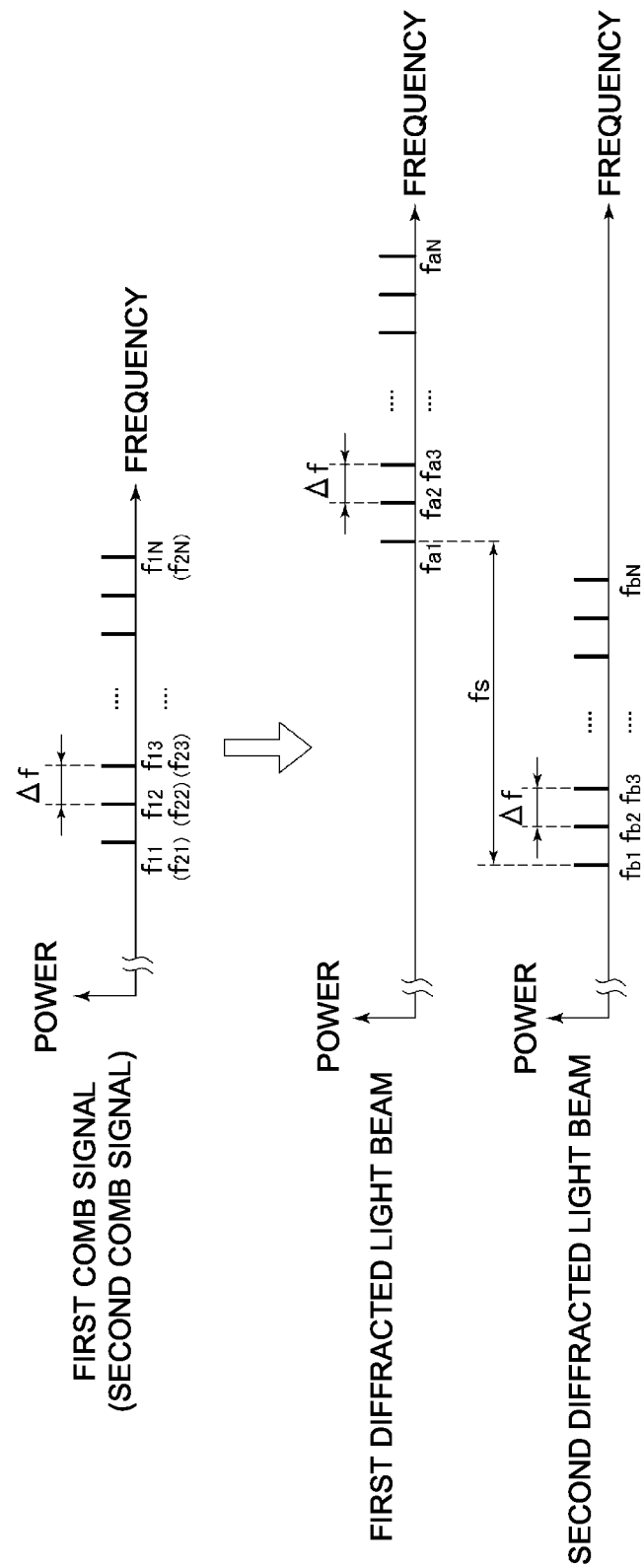
FIG. 2 is an explanatory view illustrating frequency spectrums of a comb signal and first and second diffracted light beams.

As illustrated in FIG. 2, the first comb signal is obtained by superposing N pieces of the driving signals from a frequency $f_{11}$ to a frequency $f_{1N}$ at a constant frequency interval $\Delta f$. As a result, N beams of first diffracted light from the frequency $f_{a1}$ to the frequency $f_{aN}$ is output from the first AOD 24 at the frequency interval $\Delta f$. Here, assuming that the frequencies of the first laser beams, that is, the laser beams output from the laser device 15 are $f_0$ and i is 1, 2 . . . N, it is "$f_{ai}=f_0+f_{1i}$". Moreover, by making the frequency interval $\Delta f$ constant, differences in the deflection angles between the adjacent first diffracted light beams are all made equal.

In this example, the AOD with a range of operable driving signal (hereinafter referred to as an operation band) of 100 MHz to 200 MHz is used as the first AOD 24. Moreover, assuming that the frequency interval $\Delta f$ in the first comb signal is 1 MHz, the driving signals from 101 MHz (=$f_{11}$) to 200 MHz (=$f_{1(100)}$) are superposed, whereby 100 (=N) beams of first diffracted light with the frequencies changing at a 1-MHz interval (=$\Delta f$) are generated.

In FIG. 1, in the second arm 18, the second laser beam from the polarization beam splitter 16 enters the second AOD 34 via the mirror 31, an AOFS 32, and the anamorphic prism pair 33. The AOFS 32 as a frequency converting portion is driven by a shift signal from a shift signal generating unit 43 and lowers the frequency of the second laser beam only by a shift frequency $f_s$. This AOFS 32 uses as the second AOD 34 the AOD which has the same operation band and the same characteristic as the first AOD 24 and is configured such that a frequency range of the plurality of first diffracted light beams (first frequency range) is not overlapped with a frequency range of the plurality of second diffracted light beams (second frequency range) output from the second AOD 34. Thus, the shift frequency $f_s$ is determined so that the frequency range of the plurality of first diffracted light beams is not overlapped with the frequency range of the plurality of second diffracted light beams. In this example, the shift frequency $f_s$ is assumed to be 100 MHz. Moreover, the frequency of the second laser beam may be made higher only by the shift frequency $f_s$ by the AOFS 32.

As described above, the AOFS 32 is provided so that the frequency range of the plurality of first diffracted light beams is not overlapped with the frequency range of the plurality of second diffracted light beams and thus, if the plurality of first diffracted light beams and the plurality of second diffracted light beams with the frequency ranges not overlapped can be generated directly from the first and second laser beams by the first and second AODs 24 and 34, the AOFS 32 is not needed. Moreover, as will be described later, the beat frequency of the interference light beam can be lowered by generating the interference light beam by combining the first diffracted light beam from the first AOD 24 and the second diffracted light beam from the second AOD 34 and thus, the AOFS for lowering the beat frequency correspondingly to the responsiveness of the light detection unit 13 and the response speed of the fluorescent substance of the sample T can be made unnecessary.

The anamorphic prism pair 33 deforms the beam shape of the second laser beam from the AOFS 32 from a circular shape to an oval shape. This deformation is made by extending the beam shape along a diffraction direction of the second laser beam by the second AOD 34. The anamorphic prism pair 33 suppresses the spread of each of the second diffracted light beams output from the second AOD 34 similarly to the anamorphic prism pair 22 and prevents deterioration of the resolution.

The second AOD 34 is driven by a second comb signal from the comb signal generating unit 42 and generates N beams of second diffracted light from the second laser beam by diffraction. Each of the second diffracted light beams from the second AOD 34 enters the beam splitter 19. The second comb signal is obtained by superposing a plurality of driving signals with frequency different from each other similarly to the first comb signal, and the input of the second comb signal causes the second AOD 34 to simultaneously output the N beams of second diffracted light with different deflection angles. The frequency of each of the second diffracted light beams is higher than that of the second laser beam only by the frequency of the driving signal due to the frequency shift.

In this example, the same AOD as the first AOD 24 is used as the second AOD 34 as described above. That is, the first AOD 24 and the second AOD 34 are used such that deflection angles of the diffracted light beam to the driving signals with the same frequency become equal and change amounts in the deflection angles of the first diffracted light beam and the second diffracted light beam with respect to the change amount in the frequency of the driving signal are the same. Moreover, as illustrated in FIG. 2, the frequency of each driving signal of the second comb signal is made equal to the frequency of each driving signal of the first comb signal ($f_{1i}=f_{2i}$). Therefore, the second comb signal is the one in which N pieces of driving signals from the frequency $f_{21}$ ($=f_{11}$) to the frequency $f_{2N}$ ($=f_{1N}$) at the frequency interval $\Delta f$ are superposed. The N beams of second diffracted light from the frequency $f_{b1}$ to the frequency $f_{bN}$ at the frequency interval $\Delta f$ are output from the second AOD 34. The frequency $f_{bi}$ of the second diffracted light beam is "$f_{bi}=f_0-f_s+f_{2i}$" by using the frequency $f_{21}$ of the corresponding driving signal.

By using the same AOD as the first AOD 24 and the second AOD 34, superposition of the plurality of first diffracted light beams and the plurality of second diffracted light beams for generating a plurality of interference light beams is made easy. That is, by using the first AOD 24 and the second AOD 34 so that the change amounts in the deflection angles of the first diffracted light beam and the second diffracted light beam with respect to the change amount in the frequency of the driving signal in the comb signal are made equal, angular intervals of the deflection angles of the plurality of first diffracted light beams and the plurality of second diffracted light beams can be made equal to each other, and the superposition of them is made easy. For example, a plurality of desired interference light beams can be obtained by superposing the plurality of first diffracted light beams on the plurality of second diffracted light beams with simple configuration as the beam splitter 19 as will be described later.

The aforementioned second AOD 34 generates 100 (=N) beams of second diffracted light a frequency of which changes at the 1-MHz interval ($=\Delta f$) similarly to the first AOD 24. Moreover, the deflection angles of the second diffracted light beam and the first diffracted light beam to the driving signal with the same frequency are equal, but regarding the frequencies, the frequency of the first diffracted light beam is higher only by the shift frequency fs of the AOFS 32 ($f_{ai}=f_{bi}+f_s$).

Figure 3:
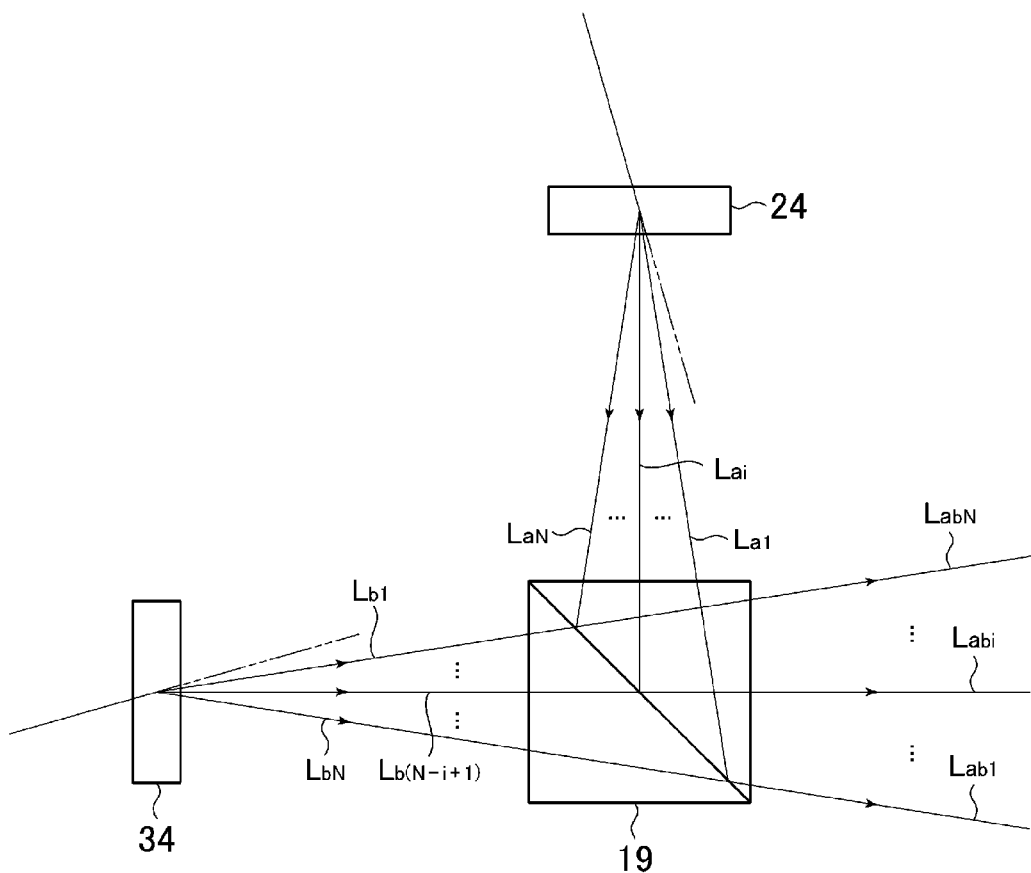
FIG. 3 is an explanatory view illustrating a combination of the first diffracted light beam and the second diffracted light beam for generating interference light beam.

The beam splitter 19 as a superposition unit generates N beams of interference light in which the first diffracted light beam and the second diffracted light beam interfere with each other by combining and superposing the plurality of first diffracted light beams on the plurality of second diffracted light beams with frequencies different from each other. As illustrated in FIG. 3, the first AOD 24 and the second AOD 34 are disposed so as to output each of the first diffracted light beams and each of the second diffracted light beams on the same horizontal plane, and assuming that the frequency of the first diffracted light beam $L_{ai}$ is $f_{ai}$ and the frequency of the second diffracted light beam $L_{bi}$ is $f_{bi}$, their directions are adjusted so that the first diffracted light beam $L_{ai}$ and the second diffracted light beam $L_b$(N−i+1) are superposed so as to generate the interference light beam $L_{abi}$ by the beam splitter 19. That is, the first diffracted light beam and the second diffracted light beam are combined in ascending order of frequency for the first diffracted light beams and in descending order of frequency for the second diffracted light beams, thereby generating N beams of interference light. As described above, the first diffracted light beam and the second diffracted light beam selected in ascending order of frequency for the first diffracted light beams as the first light beams and in descending order of frequency for the second diffracted light beams as the second light beams are combined so as to generate N beams of interference light. Regarding the frequencies $f_{ai}$ and $f_{bi}$ of the first diffracted light beam $L_{ai}$ and the second diffracted light beam $L_{bi}$, the larger the "1" is, the higher the frequency is ($f_{a(i+1)} \geq f_{ai}$, $f_{b(i+1)} \geq f_{bi}$).

When the interference light beam is to be generated, the second diffracted light beam corresponding to the first diffracted light beam does not have to be completely superposed. Moreover, an optical path length of each laser beam of the first arm 17 and the second arm 18 is made to match within a range where the first diffracted light beam and the second diffracted light beam interfere with each other (a range of a coherent length).

Figure 4A:
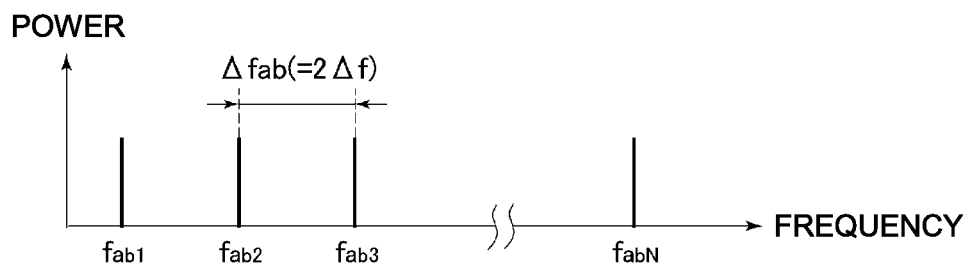
FIG. 4A is an explanatory view illustrating frequency spectrums of the interference light beams.

As described above, by superposing the first diffracted light beam with the second diffracted light beam, the adjacent beat frequencies $f_{abi}$ ($=f_{ai}-f_{b(N-i+1)}$) of each interference light beam is made to have a constant frequency interval $\Delta f_{ab}$ ($=f_{ab(i+1)}-f_{abi}$), and the frequency interval $\Delta f_{ab}$ is made wider than before as illustrated in FIG. 4A. Specifically, the frequency interval of the adjacent beat frequencies by the method described in Patent Literature 1 is the same as the frequency interval of the driving signal of the AOD generating the diffracted light beam and corresponds to the frequency interval $\Delta f$ of this example. However, in this example, the frequency interval $\Delta f_{ab}$ of the adjacent beat frequencies $f_{ab}$ is twice of the frequency interval $\Delta f$ of the driving signal of the AOD ($\Delta f_{ab} = 2 \cdot \Delta f$).

Figure 4B:
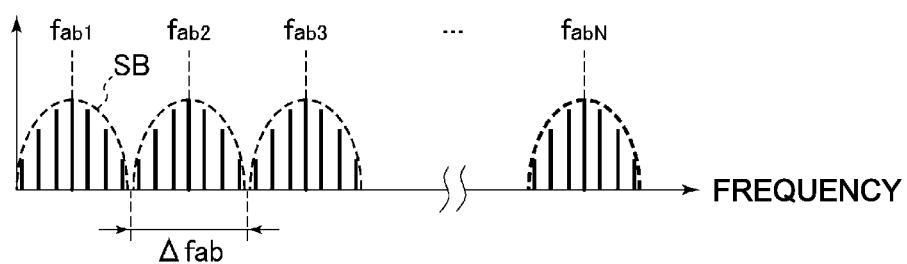
FIG. 4B is an explanatory view illustrating frequency spectrums of detection light.

As illustrated in FIG. 4B, each beat frequency $f_{abi}$ becomes a carrier frequency (center frequency) of an optical signal changing in accordance with a change in fluorescence of the sample T, that is, in the light intensity of the fluorescence, and a width usable as a side wave SB for each carrier frequency, that is, a bandwidth becomes the frequency interval $\Delta f_{ab}$. Therefore, the bandwidth of each carrier frequency and the entire bandwidth usable in detection by N beams of interference light becomes twice of the conventional method.

Specifically, since the frequency interval $\Delta f$ is 1 MHz in this example, the bandwidth of each carrier frequency is 2 MHz and the entire bandwidth is 200 MHz in this example, while the bandwidth of each carrier frequency is 1 MHz and the entire bandwidth is 100 MHz in the conventional method.

Moreover, since the interference light beam is generated by superposing the corresponding second diffracted light beam and each of the plurality of first diffracted light beams as described above, the laser beam not used for the interference distributed around each of the first diffracted light becomes less. Thus, generation efficiency of the interference light beam becomes higher, and light intensity of each interference light beam can be improved and thus, a shot noise can be reduced.

The combination of the first diffracted light beam and the second diffracted light beam when the plurality of interference light beams with different beat frequencies are generated is one example as described above and is not limiting. In order to generate the plurality of interference light beams with different beat frequencies, it is only necessary to combine the plurality of first diffracted light beams and the plurality of second diffracted light beams so that the differences in the frequency between the first diffracted light beam and the second diffracted light beam become different.

In FIG. 1, the N beams of interference light from the beam splitter 19 is output so as to be aligned at an equal angular interval on the horizontal plane and enters a dichroic mirror 46 via an anamorphic prism pair 44 and a relay optical system 45 which are a part of the interference light generation unit 11. At this time, a direction in which the N beams of interference light are aligned is a direction corresponding to a main scanning direction, and a direction orthogonal to this main scanning direction is a sub scanning direction. In this example, the main scanning direction is a vertical direction indicated by an arrow M and the sub scanning direction is a horizontal direction indicated by an arrow S in the interference light irradiation unit 12.

The anamorphic prism pair 44 makes the beam shape of each interference light beam which is made an oval shape by the anamorphic prism pairs 22 and 33 to a circular shape by extending it in its short axis direction. A cylindrical lens or the like may be used instead of the anamorphic prism pairs 22, 33, and 44.

The relay optical system 45 is constituted by a lens 45a disposed on the beam splitter 19 side and a lens 45b disposed on the dichroic mirror 46 side and they are disposed so that a front-side focal position of the lens 45a is matched with output surfaces of the first and second AODs 24 and 34 and a rear-side focal position of the lens 45b is matched with a reflection surface of a scanning mirror 47a which will be described later. As a result, each interference light beam enters the scanning mirror 47a in a state where the predetermined beam diameter is held. The dichroic mirror 46 reflects each interference light beam having passed through the relay optical system 45 toward the interference light irradiation unit 12 and transmits the detection light from the interference light irradiation unit 12 and sends it to the light detection unit 13.

The interference light irradiation unit 12 is constituted by a resonant scanner 47 including the scanning mirror 47a, a mirror 48, a relay optical system 51, an objective lens 52, a stage on which the sample T is placed (not shown) and the like. The N beams of interference light from the dichroic mirror 46 enters the objective lens 52 via the scanning mirror 47a, the mirror 48, and the relay optical system 51 and irradiates the sample T. Each interference light beam reflected from the dichroic mirror 46 is bent upward by 90 degrees by the scanning mirror 47a and then, enters the mirror 48.

The resonant scanner 47 carries out equiangular scanning by periodically deflecting each interference light beam in the sub scanning direction by causing the scanning mirror 47a to oscillate around a rotation shaft 47b in parallel with the horizontal direction orthogonal to an incident direction of the interference light beam.

The relay optical system 51 is constituted by a lens 51a disposed on the mirror 48 side and a lens 51b disposed on the objective lens 52 side and they are disposed so that a front-side focal position of the lens 51a is matched with a reflection surface of the scanning mirror 47a and a rear-side focal position of the lens 51b is matched with an incident pupil of the objective lens 52. By means of this relay optical system 51, each interference light beam enters the incident pupil of the objective lens 52 while expanding substantially to the full.

Figure 5:
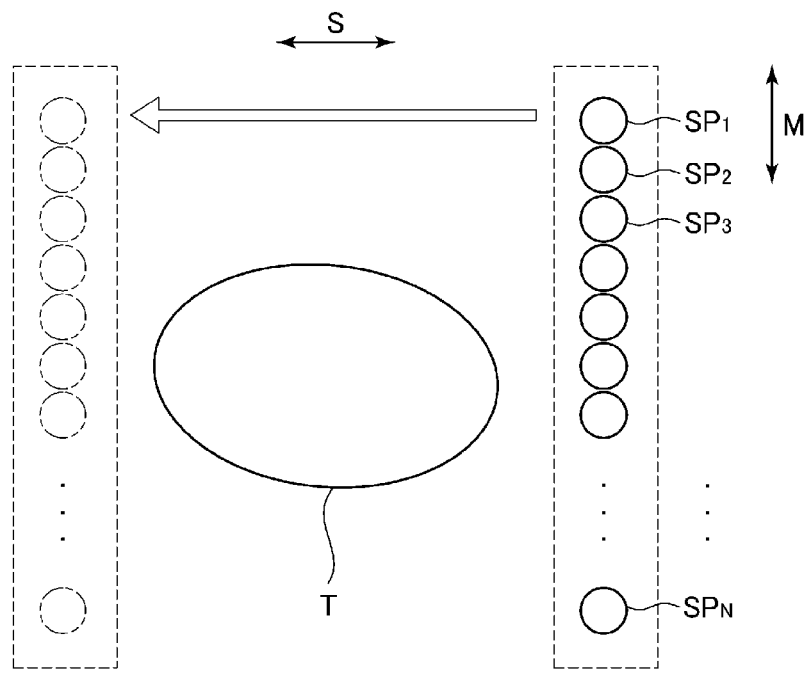
FIG. 5 is an explanatory view illustrating a moving state of an irradiation spot to a sub scanning direction.

The objective lens 52 collects the incident N beams of interference light and outputs them toward the sample T. As illustrated in FIG. 5, the objective lens 52 collects the interference light beams onto a focal plane to form N pieces of irradiation spots $SP_1$ to $SP_N$. The irradiation spots $SP_1$ to $SP_N$ are aligned linearly in the main scanning direction at substantially the same pitch as their diameters. Diameters of the irradiation spots $SP_1$ to $SP_N$ (full width at half maximum) is approximately 330 nm in this example.

The irradiation spots $SP_1$ to $SP_N$ are moved in the sub scanning direction at the same time by the oscillation of the scanning mirror 47a while maintaining the linearly aligned state. As a result, the sample T is two-dimensionally scanned by one movement of the irradiation spots $SP_1$ to $SP_N$ in the sub scanning direction. At this time, by using a region of the objective lens 52 in which an image height is changed in proportion to a change in the incidence angle of the light beam, the equiangular scanning in the sub scanning direction of the interference light beam by the scanning mirror 47a becomes the equal-speed linear scanning. One movement of the irradiation spots $SP_1$ to $SP_N$ in one direction completes one frame of scanning. If the irradiation spots $SP_1$ to $SP_N$ do not have to be particularly discriminated from each other, they are referred to as an irradiation spot SP in the following.

In this example, the resonant scanner 47 is a scanning unit which moves an irradiation line of the irradiation spots $SP_1$ to $SP_N$ aligned on a line in the sub scanning direction with respect to the sample T, but as the scanning unit, other light deflecting means such as a Galvano mirror and a polygon mirror may be used instead of the resonant scanner 47.

Moreover, in this example, the irradiation line of the irradiation spots $SP_1$ to $SP_N$ aligned on the line are moved in the sub scanning direction with respect to the fixed sample T, but the two-dimensional scanning of the sample T by the scanning unit only needs to relatively move the sample T and the irradiation line. Therefore, as in the fourth embodiment which will be described later, the sample T may be moved in the sub scanning direction with respect to the fixed irradiation line. Moreover, in this example, the relative moving directions of the sample T and the irradiation line are made to match the sub scanning direction orthogonal to the main scanning direction in which the irradiation spots $SP_1$ to $SP_N$ are aligned, but the moving direction only needs to include a component in the sub scanning direction. That is, it is only necessary that the relative moving directions of the sample T and the irradiation line are not in parallel with the main scanning direction, and assuming that an angle formed by the relative moving directions of the irradiation line and the sample T is $\theta$, it is only necessary that "$0°<\theta 90°$" is satisfied. Therefore, it is only necessary to relatively move the sample T and the irradiation line in the direction crossing the main scanning direction, and in this example, the irradiation line only needs to be moved in the direction crossing the main scanning direction.

If the relative moving directions of the sample T and the irradiation line are not directions orthogonal to the main scanning direction, that is, in the case of "$0°<\theta<90°$", the interval between the irradiation spots in the direction orthogonal to the moving direction becomes substantially smaller (cos $\theta$ times) and thus, a pixel size in this direction is made smaller (the pixel resolution is improved), whereby an effect of resolution improvement can be obtained.

The objective lens 52 is made movable in its optical axis direction and can be moved by a motor (not shown), for example. As a result, scanning can be carried out by changing a position of the focal plane of the objective lens 52 with respect to the sample T. A stage on which the sample T is placed may be moved in the optical axis direction of the objective lens 52.

Since the sample T in the irradiation spot SP is irradiated with the interference light beam, the fluorescent substance in the sample T in the irradiation spot SP is excited and generates fluorescence. Then, the irradiation spots $SP_1$ to $SP_N$ move in the sub scanning direction and thus, the N lines of the sub scanning lines aligned in the main scanning direction are irradiated with the interference light beam, respectively, by the N pieces of the irradiation spots $SP_1$ to $SP_N$ aligned in the main scanning direction. As a result, the fluorescence is emitted from each of the sub scanning lines. The light intensity of the fluorescence emitted from each of the sub scanning lines is changed in accordance with the beat frequency of the irradiated interference light beam and is changed in accordance with distribution of the fluorescent substance in the sub scanning line by movement of the irradiation spot SP in the sub scanning direction. That is, the fluorescence is an optical signal obtained by modulating intensity of a signal with the beat frequency of the irradiated interference light beam as a carrier frequency in accordance with the distribution of the fluorescent substance.

For both the first diffracted light beam and the second diffracted light beam, the intensity distribution is Gaussian distribution, and the interference light beam is obtained by superposing the first diffracted light beam and the second diffracted light beam and thus, a half width of the intensity distribution is narrow, and kurtosis becomes large. Thus, the method of irradiating the sample T with the interference light beam obtained by superposing the first diffracted light beam and the second diffracted light beam has a merit that the spatial resolution is higher than the conventional method.

In FIG. 1, each fluorescence emitted from the irradiation spots $SP_1$ to $SP_N$ as described above is collected by the objective lens 52, and the detection light made of the each fluorescence enters the relay optical system 51 from the objective lens 52, and the detection light having entered the relay optical system 51 enters the dichroic mirror 46 via a path opposite to the interference light beam.

The detection light incident to the dichroic mirror 46 is transmitted through the dichroic mirror 46 and is sent to the light detection unit 13. The light detection unit 13 includes a mirror 54, a collecting lens 55, a slit plate 56, a photomultiplier tube (hereinafter, PMT) 57 as a photodetector, an amplifier 58, and a digitizer 59. The detection light enters the PMT 57 via the mirror 54 and the collecting lens 55. The slit plate 56 is disposed at a focal position of the collecting lens 55, and only the detection light having been transmitted through a slit 56a formed in the slit plate 56 enters the PMT 57. As a result, using the laser microscope system 10 as a confocal system, only the fluorescence component from the focal plane of the objective lens 52 enters the PMT 57 so that the contrast and the spatial resolution are improved. A longitudinal direction of the slit 56a is a direction obtained by projecting the main scanning direction in the focal plane of the objective lens 52 through an optical system between the focal plane and the slit plate 56. As the photodetector, an avalanche photodiode or the like may be used instead of the PMT 57. The slit plate 56 may be omitted.

The PMT 57 outputs a detection signal according to the intensity of the incident detection light. That is, the fluorescence modulated in accordance with the distribution of the fluorescent substance is emitted from each of the irradiation spots $SP_1$ to $SP_N$ as an optical signal, respectively, and the detection light as a multiplexed signal obtained by superposing and multiplexing those optical signals is detected by the PMT 57, and a detection signal corresponding to the multiplexed signal is output. At this time, in each optical signal, the beat frequency of the interference light beam irradiated as above is the carrier frequency.

The detection signal from the PMT 57 is amplified by the amplifier 58 and the signal level is sampled by a predetermined sampling frequency by the digitizer 59 and is digital-converted to detection data. By means of detection by the digitizer 59 of start and end of one frame of the scanning by a synchronization signal output by the resonant scanner 47 in synchronization with the oscillation of the scanning mirror 47a, the detection signal of one frame is converted to the detection data. The sampling frequency of the digitizer 59 is made higher than twice of an upper limit frequency of the band of the detection light. The upper limit frequency of the band of the detection light is higher than the highest beat frequency only by the frequency interval $\Delta f$ ($=\Delta f_{ab}$) and thus, the upper limit frequency in this example is 200 MHz, and the sampling frequency is set to 1 GHz, for example.

The detection data converted from the detection signal is sent to the signal processing unit 14. This signal processing unit 14 is constituted by a PC, for example, and obtains distribution of information of the sample T from the detection signal or the fluorescent substance in this example. The signal processing unit 14 has a Fourier transform portion 14a, an inverse Fourier transform portion 14b, an image processing portion 14c, and a monitor 14d. First, the Fourier transform portion 14a performs fast Fourier transformation on the detection data of one frame obtained in one session of the sub scanning, and the frequency spectrum is acquired.

The beat frequencies of the irradiation spots $SP_1$ to $SP_N$ are preferably set to integer times of a ratio (=fd/Nd) between the sampling number (Nd) for one frame by the digitizer 59 and the sampling frequency (fd). As a result, the beat frequency of each of the irradiation spots $SP_1$ to $SP_N$ is accurately matched with a frequency data point after the Fourier transformation and thus, accuracy of the data processing in the second half can be improved.

Subsequently, the frequency spectrum is separated for each beat frequency of the interference light beam from the frequency spectrum acquired by the Fourier transform portion 14a by a predetermined bandwidth $\Delta f_w$ ($\leq 2\Delta f$) with the beat frequency as the carrier frequency, and the inverse Fourier transformation is applied to each of the separated frequency spectrum by the inverse Fourier transform portion 14b. The separation of the frequency spectrum corresponds to separation of the frequency spectrum by each sub scanning line and is a frequency spectrum of the modulated fluorescence (optical signal) obtained by irradiation of the interference light beam to the sub scanning line. By means of this inverse Fourier transformation, distribution of the fluorescent substance can be acquired in a time axis direction from the frequency spectrum, that is, along each of the sub scanning lines. The distribution of the fluorescent substance for the N lines of the sub scanning line acquired by the inverse Fourier transform portion 14b is converted to an observation image in which the distribution is two-dimensionally mapped by the image processing portion 14c and displayed on the monitor 14d. It is also possible to obtain an image to which short-time Fourier transformation (STFT) is applied instead of the fast Fourier transformation and the inverse Fourier transformation. In this case, a spectrum of the STFT within a time range corresponding to a pixel in the main scanning direction corresponds to brightness distribution in the sub scanning direction, and a time change of the STFT spectrum becomes an observation image.

As described above, since the bandwidth of each carrier frequency is wider than before, the distribution of the fluorescent substance along the sub scanning line can be acquired by using even the modulation component of the frequency higher than before. Therefore, a favorable observation image can be obtained even if the moving speed of each irradiation spot SP in the sub scanning direction is increased.

Figure 6:
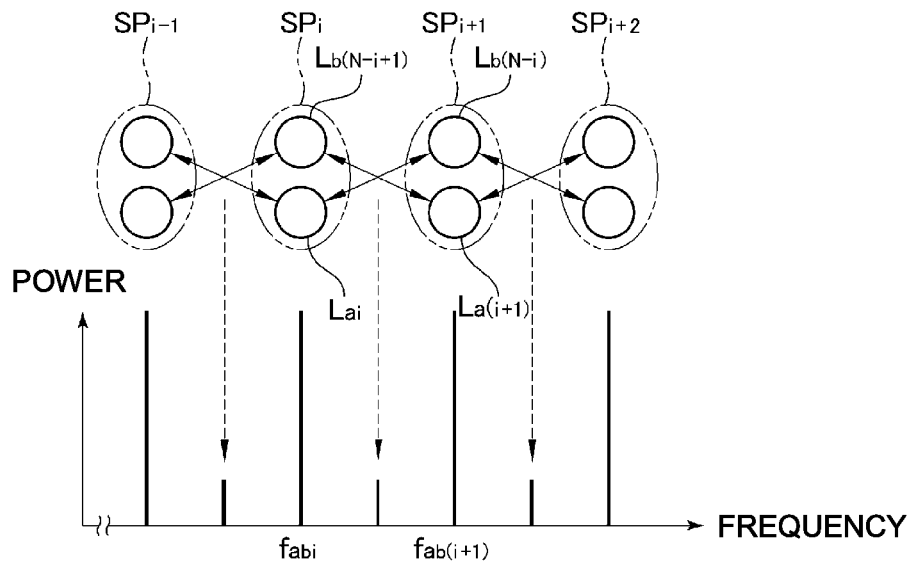
FIG. 6 is an explanatory view illustrating a crosstalk occurring between adjacent irradiation spots.

A crosstalk may occur between a pair of irradiation spots SP and an unnecessary crosstalk component (beat frequency) may occur in some cases. For example, as schematically illustrated in FIG. 6, the unnecessary crosstalk component occurs in the middle of the adjacent beat frequency $f_a bi$ and the beat frequency $f_{ab(i+1)}$ by the interference between the first diffracted light beam $L_{ai}$ of the interference light beam forming the irradiation spot $SP_i$ and the second diffracted light beam $L_{b(N-i)}$ of the interference light beam forming the irradiation spot $SP_{i+1}$ and the interference between the second diffracted light beam $L_{b(N-i+1)}$ of the interference light beam forming the irradiation spot $SP_i$ and the first diffracted light beam $L_{a(i+1)}$ of the interference light beam forming the other irradiation spot $SP_{i+1}$, respectively, between the adjacent irradiation spots $SP_i$ and $SP_{i+1}$.

Figure 7:
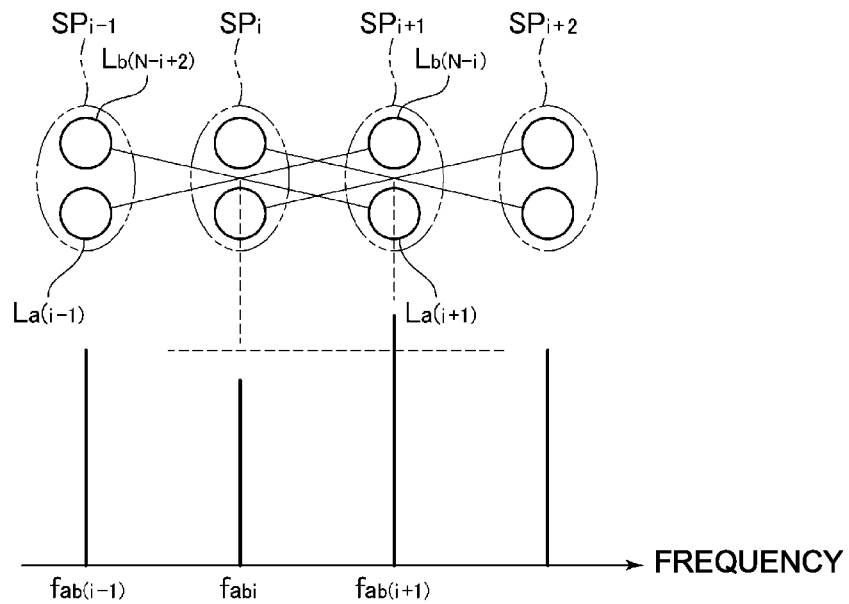
FIG. 7 is an explanatory view illustrating the crosstalk occurring between a pair of irradiation spots sandwiching one irradiation spot between them.

Moreover, as illustrated in FIG. 7, the crosstalk component with the same frequency as the beat frequency $f_{abi}$ of the interference light beam forming the intermediate irradiation spots $SP_i$ occurs by the interference between the first diffracted light beam $L_{a(i-1)}$ of the interference light beam forming the irradiation spot $SP_{i-1}$ and the second diffracted light beam $L_{b(N-i)}$ of the interference light beam forming the irradiation spot $SP_{i+1}$ and the interference between the second diffracted light beam $L_{b(N-i+2)}$ of the interference light beam forming the irradiation spot $SP_{i-1}$ and the first diffracted light beam $L_{a(i+1)}$ of the interference light beam forming the irradiation spot $SP_{i+1}$ between the pair of irradiation spots $SP_{i-1}$ and $SP_{i+1}$ sandwiching one irradiation spot $SP_i$, respectively, and thus, the amplitude of the component of the beat frequency $f_{abi}$ is increased or decreased.

The crosstalk as above can be suppressed by satisfying the following two conditions. The first condition is that phases of the first diffracted light beam and the second diffracted light beam of each of the pair of irradiation spots are set so that the crosstalk components occurring due to interferences of the first diffracted light beam and the second diffracted light beam cancel each other for the crosstalk between the pair of adjacent irradiation spots. The second condition is that either of the crosstalk components have a certain phase for the interference light beam of the beat frequency having an influence for the crosstalk between the pair of irradiation spots sandwiching the one irradiation spot. Specifically, the phase is set to "0" for each of the first diffracted light beams, and the phase of the second diffracted light beam only needs to be shifted by a half cycle ($\pi$) for every other frequencies (wavenumbers) in order of frequency such as 0, $\pi$, 0, $\pi$, 0 . . . .

The phases of the first and second diffracted light beams match the phases of the driving signals (comb components) of the first and second comb signals and thus, in order to set the phase of each of the first and second diffracted light beams as above, it is only necessary to shift the phase of each driving signal of the second comb signal by a half cycle ($\pi$) for every other frequencies in order of frequency such as 0, $\pi$, 0, $\pi$, 0 . . . . The phase of each of the second diffracted light beams may be set to "0" and the phase of the first diffracted light beam may be shifted by a half cycle ($\pi$) for every other frequencies in order of frequency, such as 0, $\pi$, 0, $\pi$, 0 . . . .

Both the first comb signal and the second comb signal can show an extremely high peak value instantaneously due to the interference of each of the driving signals. If such a phenomenon occurs, entire amplitudes of the first comb signal and the second comb signal become smaller due to the influence of the extremely high peak value and as a result, the entire amplitude of the interference light beam also becomes small. In order to prevent occurrence of such an extremely high peak value and to suppress the crosstalk component, the phase of the first diffracted light beam is set in ascending order of frequency, such as 0, $\phi$, 3$\phi$, 6$\phi$, 10$\phi$, . . . and the phase of the second diffracted light beam is set in descending order of frequency, such as 0, $\pi-\phi$, $-3\phi$, $\pi-6\phi$, $-10\phi$. . . . That is, assuming that i is 1, 2, . . . , N, when the interference light beam is to be generated by combining the first diffracted light beam $L_{ai}$ and the second diffracted light beam $L_{b(N-i+1)}$, the phase of the first diffracted light beam $L_{ai}$ is set to "$\phi a+i(i-1)\phi/2+(i-1)\pi$", and the phase of the second diffracted light beam $L_{b(N-i+1)}$ is set to "$\phi b-i(i-1)\phi/2+(i-1)\phi$". $\phi a$ and $\phi b$ are both arbitrary constants, and a value $\phi$ is a constant set for preventing occurrence of an extremely high peak value and only needs to be set to approximately 3°. Moreover, the value $\phi$ may be set to approximately 183°. In this case, since the crosstalk component is added to the desired beat frequency component with substantially the same phase, it has a signal reinforcing effect. The order of the phases to be given to the first diffracted light beam and the second diffracted light beam may be opposite, and the phases to be given to the first diffracted light beam and the second diffracted light beam may be switched. In this case, too, it is only necessary to set the phases of the first and second diffracted light beams to the phases of the driving signals of the first and second comb signals.

When the value $\phi$ is set to approximately 3°, p-p values (difference between a maximum value and a minimum value) of the first and second comb signals substantially match a theoretical minimum value. Moreover, the p-p value of a signal indicating the intensity change synthesizing the intensities of the interference light beams is also close to a theoretical minimum value. Therefore, diffraction efficiency of the first AOD 24 and the second AOD 34 and a dynamic range of the light detection unit 13 become larger, which is advantageous.

The crosstalk component canceled above can be used as a signal to the contrary. In this case, in order to set such that the crosstalk component is not suppressed, the phase of the first diffracted light beam $L_{ai}$ is set to "$\phi a+i(i-1)\phi/2$", and the phase of the second diffracted light beam $L_{b(N-1+1)}$ is set t"$\phi b-i(i-1)\phi/2$" similarly to the above, for example. Furthermore, in order to give sufficient amplitude to the crosstalk component, regarding the plurality of irradiation spots SP aligned in the main scanning direction, a center interval of the adjacent irradiation spots SP is made smaller than a spot diameter of the irradiation spot SP so that parts of the adjacent irradiation spots SP are overlapped with each other. This is because the superposition is made larger so that the amplitude is preferably made as large as possible when the crosstalk component is used as a signal since the crosstalk component also occurs by the superposition of the diffracted light beams similarly to the signal component described above. In this case, the crosstalk component of the two pairs of the first diffracted light beam and the second diffracted light beam between the adjacent interference light beams is given the amplitude of the same degree as the beat frequency component by the interference between the original first and second diffracted light beams, and the number of pixels (the number of lines in the sub scanning line) in the main scanning direction can be doubled. Accordingly, the frequency band per pixel is reduced by half, but since the frequency band is doubled as compared with the conventional method, information on the doubled number of pixels can be obtained at the same speed and thus, an effect of an increase in an information amount by an increase in the frequency band can be obtained as a result.

The configuration of the aforementioned laser microscope system 10 is an example, and the aforementioned configuration is not limiting. The configuration for generating the plurality of first diffracted light beams and the plurality of second diffracted light beams is not limited to the aforementioned configuration, either. For example, the first and second diffracted light beams may be generated by using the same AOD as the first and second AODs 24 and 34 and driving the first and second AODs 24 and 34 by comb signals within a frequency ranges not overlapped with each other, respectively. Specifically, the first AOD 24 may be operated by the first comb signal within the frequency range of 101 to 200 MHz, and the second AOD 34 may be operated by the second comb signal within the frequency range of 201 to 300 MHz by using the same AOD with the operating bandwidth of 100 to 300 MHz, for example, for the first and second AODs 24 and 34.

Moreover, the first and second diffracted light beams may be generated by switching positive/negative of the frequency shift by the first and second AODs 24 and 34 to each other by using the same AOD as the first and second AODs 24 and 34 and by causing the first and second laser beams to enter the corresponding AOD at switched positive/negative incidence angles. In this case, the positive/negative of the frequency shift of the first and second diffracted light beams to the first and second laser beams become opposite to each other even if the first and second comb signals within the same frequency range are used and thus, the frequency ranges of the first and second diffracted light beams are not overlapped. The sizes of the incidence angles of the first and second laser beams to the first and second AODs 24 and 34 are preferably set the same in order to improve generation efficiency of the interference light beam.

In either of the two structures, the superposition of the plurality of first diffracted light beams and the plurality of second diffracted light beams is made easier, and since the frequency ranges of the first and second diffracted light beams are not overlapped, the AOFS 32 is not needed anymore, which is advantageous in reduction of the number of components.

The first and second AODs 24 and 34 may use different AOD. Even in this case, too, by using the second AOD 34 with the same change amount of the deflection angle to the change amount of the frequency of the driving signal in the comb signal as that of the first AOD 24, superposition of the plurality of first diffracted light beams and the plurality of second diffracted light beams for generating the plurality of interference light beams is facilitated similarly to the above. Moreover, at this time, by using the second AOD 34 operable by the second comb signal within the frequency range not overlapped with the frequency range of the first comb signal, the frequency ranges of the first and second diffracted light beams are not overlapped and thus, the AOFS 32 does not have to be provided anymore.

Moreover, the interference light beam with the same beat frequency may be generated by partial overlapping of the frequency ranges of the first and second diffracted light beams. In this case, it is only necessary that the other interference light beams, while one interference light beam is left, in the interference light beam with the same beat frequency, are removed by shielding at a position where the interference light beams are collected between the lenses 45a and 45b of the relay optical system 45, for example. In such a case, too, since the actually used interference light beam is generated by using the first and second diffracted light beams with the frequency ranges not overlapped, the AOFS 32 can be omitted.

Second Embodiment

In a second embodiment, a laser microscope system is configured such that fluorescence from a sample emitted to a side opposite to the objective lens is detected. Those other than the description below are the same as in the first embodiment, and substantially the same constituent members are given the same reference numerals and the detailed description will be omitted. Moreover, since the configuration of the interference light generation unit of the laser microscope system in the second embodiment is the same as that in the first embodiment, the interference light generation unit is omitted in FIG. 8. The same as FIG. 8 applies to FIGS. 9 and 10 and FIG. 13 in third and fourth embodiments which will be described later.

Figure 8:
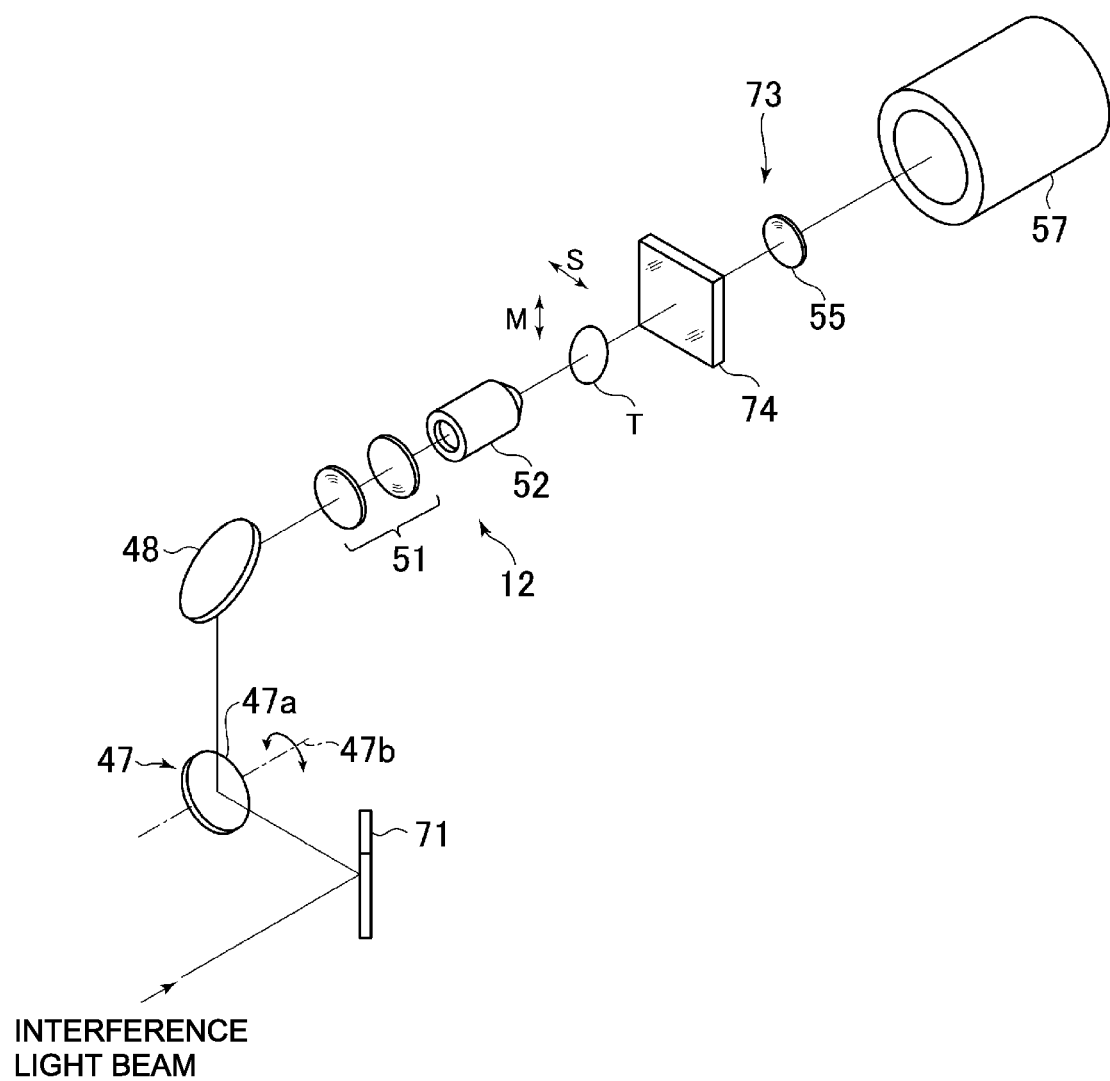
FIG. 8 is a schematic diagram illustrating main parts of a laser microscope system of a second embodiment in which a light detection unit is disposed on a side opposite to an objective lens.

As illustrated in FIG. 8, N beams of interference light generated by the interference light generation unit are reflected from a mirror 71 and sent to the interference light irradiation unit 12. In the interference light irradiation unit 12, the sample T is irradiated with the N beams of interference light via the scanning mirror 47a, the mirror 48, the relay optical system 51, and the objective lens 52 similarly to the first embodiment, N pieces of the irradiation spots aligned in the main scanning direction are moved in the sub scanning direction by the oscillation of the scanning mirror 47a, and one frame of scanning is carried out. A light detection unit 73 is disposed on a side opposite to the objective lens 52 by sandwiching the sample T. In the light detection unit 73, a bandpass filter 74, the collecting lens 55, and the PMT 57 are disposed in order from the sample T side. The bandpass filter 74 cuts the interference light beam and transmits fluorescence emitted from the sample T. As a result, in the fluorescence emitted from the sample T irradiated with the interference light beam, the fluorescence emitted to a rear side, that is, to the side opposite to the objective lens 52 is received by the PMT 57 via the bandpass filter 74 and the collecting lens 55.

Since the bandwidth of the detection light is made wider similarly to the first embodiment, even if the moving speed of each irradiation spot SP in the sub scanning direction is increased, for example, a favorable observation image can be obtained.

Third Embodiment

Figure 9:
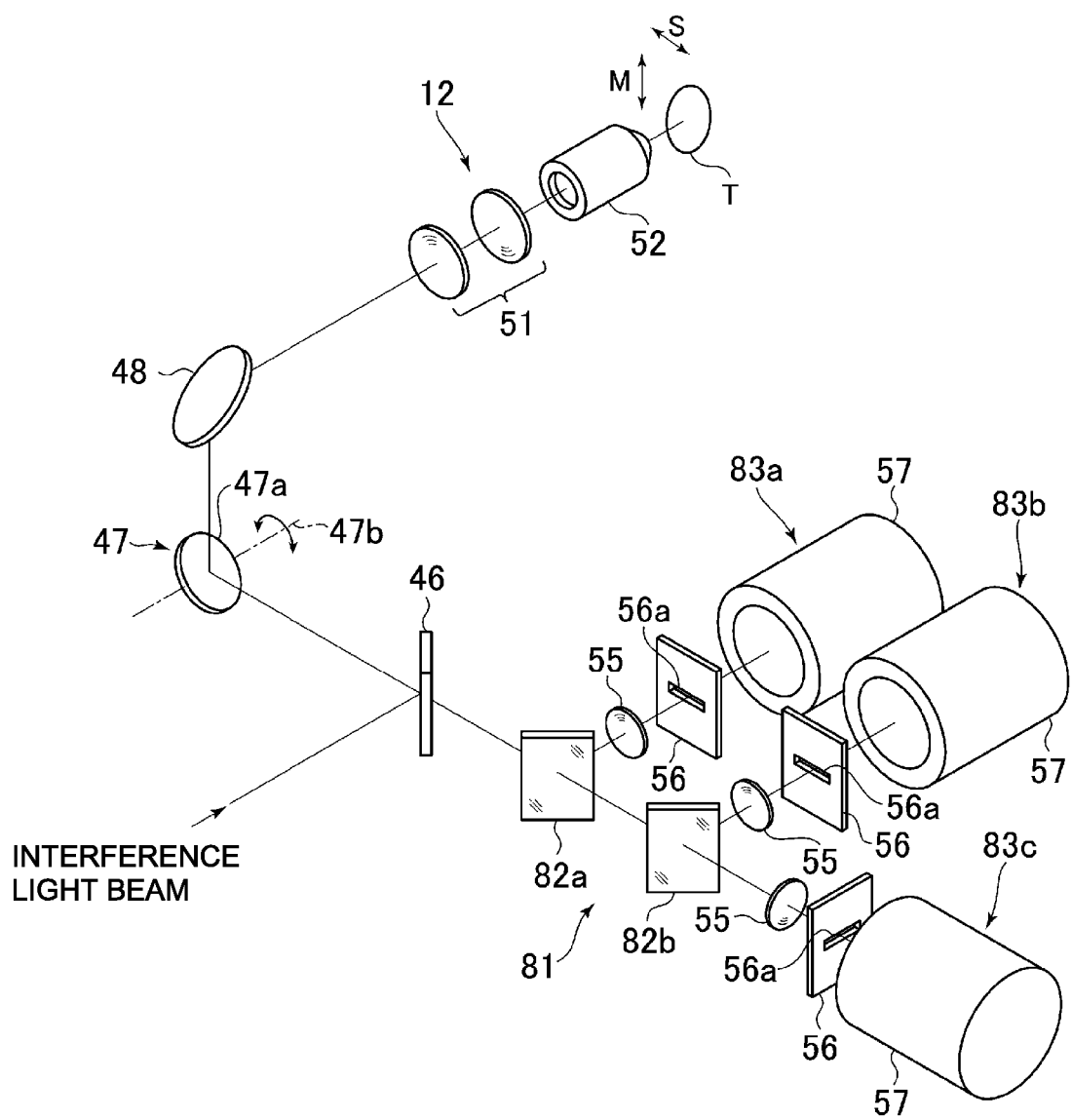
FIG. 9 is a schematic diagram illustrating main parts of a laser microscope system of a third embodiment in which fluorescence emitted from a sample is separated for each wavelength for detection.

FIG. 9 illustrates a laser microscope system in a third embodiment in which the detection light is resolved to a plurality of wavelengths and detected. The laser microscope system in the third embodiment is the same as the first embodiment except that the light detection unit which will be described below in detail is different, and substantially the same constituent members are given the same reference numerals and the detailed description will be omitted. In this example, the sample T containing any one of or two or more of three kinds of fluorescent substances emitting fluorescence with first to third wavelength components with wavelengths different from each other by the irradiation of the interference light beam is used, for example.

As illustrated in FIG. 9, a light detection unit 81 includes first and second dichroic mirrors 82a and 82b as wavelength separation units and first to third detection units 83a to 83c. The first dichroic mirror 82a reflects the fluorescence of the first wavelength component contained in the detection light toward the first detection unit 83a and transmits the other wavelength components. Moreover, the second dichroic mirror 82b reflects the fluorescence of the second wavelength component in the detection light transmitted through the first dichroic mirror 82a toward the second detection unit 83b and transmits the fluorescence of the other wavelength components toward the third detection unit 83c.

Each of the first to third detection units 83a to 83c includes the collecting lens 55, the slit plate 56, and the PMT 57. The first detection unit 83a receives, by the PMT 57, the fluorescence of the first wavelength component reflected from the first dichroic mirror 82a via the collecting lens 55 and the slit plate 56 and outputs a detection signal according to the light intensity of the fluorescence of the first wavelength component. The second detection unit 83b receives, by the PMT 57, the fluorescence of the second wavelength component reflected from the second dichroic mirror 82b via the collecting lens 55 and the slit plate 56 and outputs a detection signal according to the light intensity of the fluorescence of the second wavelength component. The third detection unit 83c receives, by the PMT 57, the fluorescence of the third wavelength component transmitted through the second dichroic mirror 82b via the collecting lens 55 and the slit plate 56 and outputs a detection signal according to the light intensity of the fluorescence of the third wavelength component.

By configuring as described above, which of the three kinds of fluorescent substances is contained in the sample T, how each of the fluorescent substances is distributed inside the sample T or the like can be observed. It is needless to say that, similarly to the first embodiment, since the bandwidth of the detection light is taken wide, even if the moving speed of each of the irradiation spots SP in the sub scanning direction is increased, for example, a favorable observation image can be obtained.

In the above, the detection light is separated to three wavelength components, but the number of separated wavelength component only needs to be two or more. Moreover, the detection light made of fluorescence emitted from the sample T to the side opposite to the objective lens 52 as in the second embodiment, the detection light made of the reflected light which is the interference light beam reflected from the sample T as will be described later, and the detection light made of the interference light beam transmitted through the sample T can be also separated to the wavelength components and detected.

Fourth Embodiment

Figure 10:
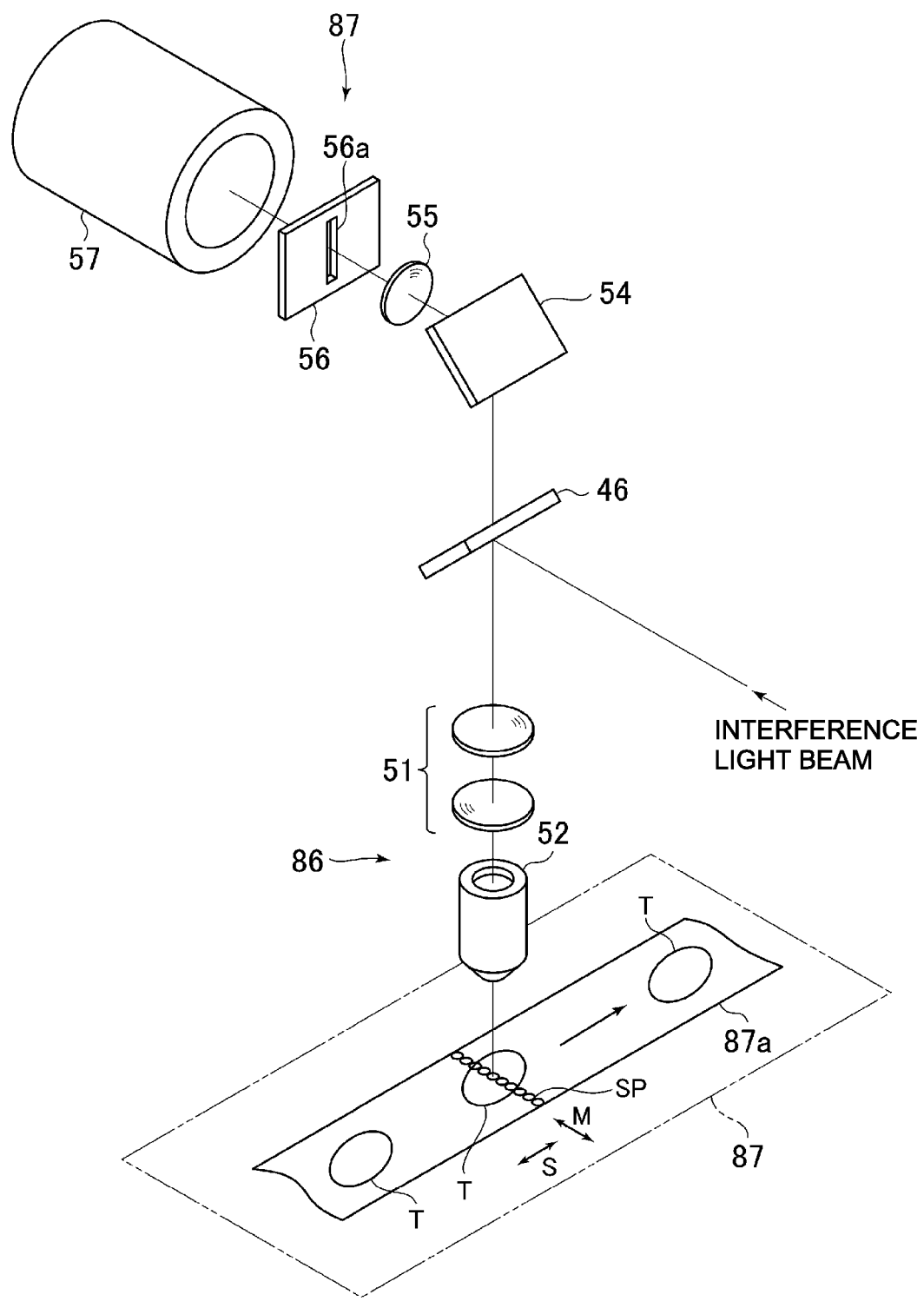
FIG. 10 is a schematic diagram illustrating main parts of a fourth embodiment in which a laser microscope system is applied to a flow cytometer.

FIG. 10 illustrates a laser microscope system of a fourth embodiment in which the irradiation spot and the sample are relatively moved in the sub scanning direction by moving the sample in the sub scanning direction. The laser microscope system in the fourth embodiment is the same as the first embodiment except those described below in detail, and substantially the same constituent members are given the same reference numerals and the detailed description will be omitted.

An example illustrated in FIG. 10 has configuration in which the laser microscope system of the present invention is applied to a flow cytometer. The interference light irradiation unit 86 irradiates a micro channel 87a formed in a flow cell (a cell for flow cytometry) 87 with the interference light beam from the objective lens 52. Adjustment is made such that a focal plane of the objective lens 52 is located inside the micro channel 87a, and the main scanning direction becomes a direction orthogonal to a flow direction in the micro channel 87a. That is, the irradiation spots SP are formed by being aligned linearly in the direction orthogonal to the flow direction in the micro channel 87a. The sample T is moved in the sub scanning direction with respect to the linearly aligned irradiation spots SP by causing the sample T to flow together with a fluid such as water through the micro channel 87a.

In this example, since there is no need to move the irradiation spots SP in the sub scanning direction by the scanning mirror or the like, N beams of interference light reflected from the dichroic mirror 46 enter the objective lens 52 via the relay optical system 51. Even if the sample T flows through the micro channel 87a at a high speed, a favorable observation image can be obtained since the bandwidth of each carrier frequency is made wider.

When the two-dimensional scanning of the sample T is carried out as described above, it is only necessary that a component in the sub scanning direction is contained in the relative moving directions of the sample T and the irradiation line on which the irradiation spots $SP_1$ to $SP_N$ are aligned and thus, it is only necessary that the main scanning direction in which the plurality of irradiation spots SP are aligned crosses the flow direction in the micro channel 87a which is the sub scanning direction in this example.

Fifth Embodiment

Figure 11:
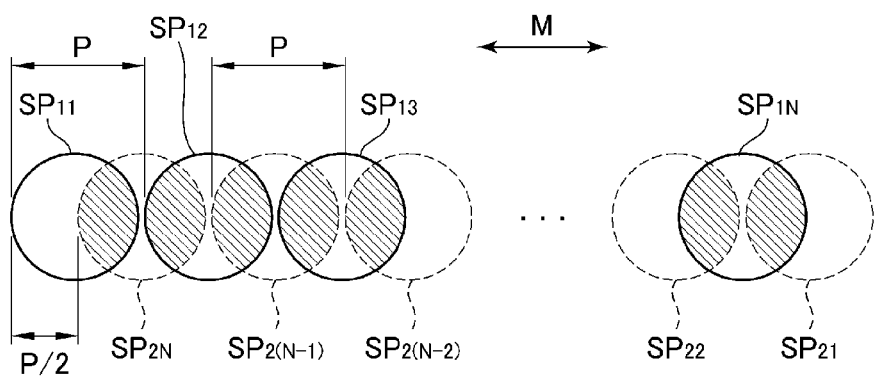
FIG. 11 is an explanatory view illustrating a fifth embodiment in which an irradiation spot of the second diffracted light beam is shifted from the irradiation spot of the first diffracted light beam.

FIG. 11 illustrates a fifth embodiment in which the first diffracted light beam is shifted from the second diffracted light beam. A laser microscope system in the fifth embodiment is the same as the first embodiment except those described below in detail, and substantially the same constituent members are given the same reference numerals and the detailed description will be omitted.

In this fifth embodiment, as illustrated in FIG. 11, the irradiation spots $S_{11}$ to $SP_{1N}$ of the first diffracted light beam and the irradiation spots $SP_{21}$ to $SP_{2N}$ of the second diffracted light beam are formed by being aligned on the same line in parallel with the main scanning direction at an alignment pitch P substantially the same as each of their diameters at the focal plane of the objective lens 52, that is, at an irradiation position of the interference light beam. The irradiation spots $SP_{21}$ to $SP_{2N}$ of the second diffracted light beam are shifted in the main scanning direction only by ½ of the alignment pitch P and superimposed on the irradiation spots $SP_{11}$ to $SP_{1N}$ by adjusting inclination of the mirror 31 in the second arm 18, for example.

Instead of the adjustment of inclination of the mirror 23, a frequency of each driving signal of either one of the first comb signal and a second comb signal may be shifted with respect to the other in order to realize the fifth embodiment. Moreover, regarding the setting of the phase, the phase of the first diffracted light beam $L_{ai}$ is set to "φa+i(i−1)φ/2", for example, similarly to the case where the crosstalk component is used as a signal as described in the first embodiment so that the cross talk component is not suppressed. Moreover, the phase of the second diffracted light beam $L_{b(N−1+1)}$ is set to "φb−i(i−1)φ/2". Furthermore, the center interval between the adjacent first diffracted light beam and second diffracted light beam and the spot diameter of the irradiation spot of the diffracted light beam only need to be set substantially the same or such that the former is smaller than the latter by increasing the beam diameters of the first and second diffracted light beams. At this time, adjustment may be made so that the spot diameter is made larger than the center interval of the first and second diffracted light beams. Superimposition between the irradiation spots of the first and second diffracted light beams is preferably made larger. The larger the superimposition between the irradiation spots of the first and second diffracted light beams is, the larger the intensity of the interference light beam becomes, and a signal level of the detection signal can be made larger in accordance with this relationship and thus, such setting is preferably made.

The irradiation spot of the interference light beam is formed as a portion where the irradiation spots $SP_{11}$ to $SP_{1N}$ of the first diffracted light beam and the irradiation spots $SP_{21}$ to $SP_{2N}$ of the second diffracted light beam are superimposed by superposing the first diffracted light beam and the second diffracted light beam as described above as indicated by hatching in the figure. As a result, the irradiation spots of the interference light beam aligned in the main scanning direction are approximately doubled as compared with the aforementioned first embodiment. That is, the number of pixels aligned in the main scanning direction (the number of sub scanning lines) can be doubled, whereby the spatial resolution in the main scanning direction is improved. In this case, the frequency band per pixel is reduced to a half, but by the doubling of the frequency band as compared with that in the conventional method, information on the doubled number of pixels can be obtained at the same speed as before and thus, an effect of an increase in the information amount by the increase in the frequency band can be obtained as a result.

This embodiment matches the case where the crosstalk component described in the first embodiment is used at the limit where the center interval between the adjacent first and second diffracted beams is made smaller. That is because, if the center interval between the adjacent first and second diffracted light beams is made smaller, spatial superposition between the adjacent first and second diffracted light beams disposed by being shifted in the main scanning direction gets closer to 100%. It is the same as the circumstances in which the beam diameter is made larger while the center interval between the first and second diffracted light beams is kept constant in FIG. 11.

Sixth Embodiment

Figure 12:
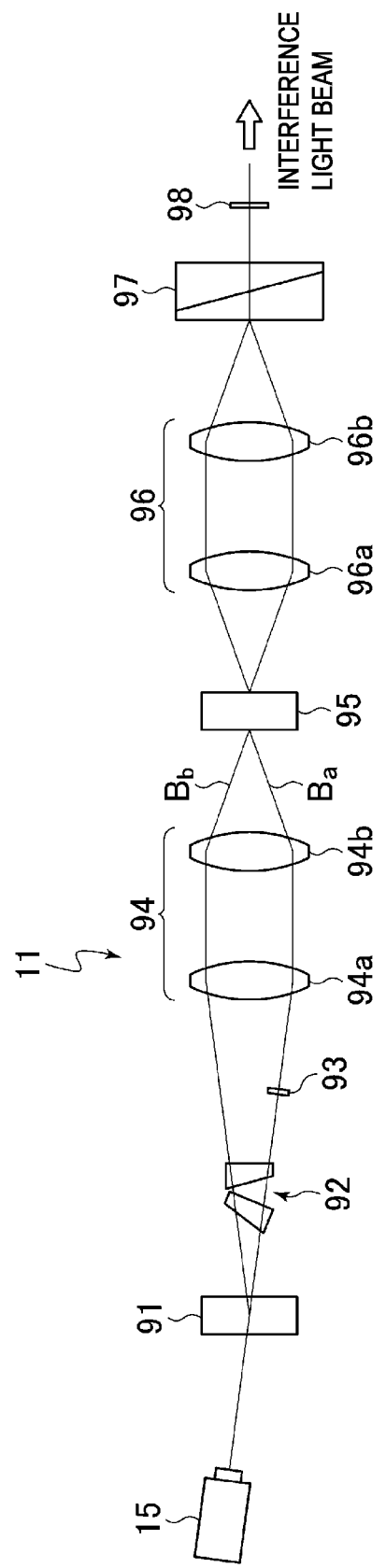
FIG. 12 is an explanatory view illustrating main parts of a sixth embodiment using one AOD.

FIG. 12 illustrates a sixth embodiment for generating the first diffracted light beam and the second diffracted light beam by using one AOD as the first AOD and the second AOD. Configuration of a laser microscope system in this sixth embodiment is different from the first embodiment only in a point that the first diffracted light beam and the second diffracted light beam are generated by using one AOD in the interference light generation unit. Thus, in FIG. 12, only an essential part of the interference light generation unit is illustrated. Moreover, the constituent members substantially the same as those in the first embodiment are given the same reference numerals and the detailed description will be omitted. Moreover, the interference light irradiation unit, the light detection unit, and the signal processing unit of the laser microscope system in the sixth embodiment can have configuration similar to the other embodiments.

As illustrated in FIG. 12, the interference light generation unit 11 of the laser microscope system is constituted by the laser device 15, an AOFS 91, an anamorphic prism pair 92, a λ/2 plate 93, a relay optical system 94, an AOD 95, a relay optical system 96, a Wollaston prism 97, a polarizer 98 and the like. A laser beam of linear polarization from the laser device 15 enters the AOFS 91. The AOFS 91 separates the laser beam to a first laser beam Ba and a second laser beam Bb. The AOFS 91 outputs a transmitted component obtained by transmitting the incident laser beam without any change as the first laser beam Ba (transmitted light) and outputs a diffracted component as the second laser beam Bb (converted light).

The AOFS 91 in this embodiment is provided in order to bring frequency ranges of two types of diffracted light beams generated by the AOD 95 closer to each other and to lower the beat frequency of the interference light beams, unlike the first embodiment. For example, if the frequency range of the driving signal to the AOD 95 is from 100 MHz to 200 MHz, a range of the frequency shift of the first diffracted light beam generated from the first laser beam Ba is from 100 MHz to 200 MHz, and a range of the frequency shift of the second diffracted light beam generated from the second laser beam Bb is from "−100 MHz" to "−200 MHz". In order to set the frequency range of the beat frequency of the interference light beam by them from 0 Hz to 200 MHz, a frequency shift amount of the AOFS 91 only needs to be set to "+200 MHz". If there is no frequency shift by the AOFS 91, the frequency range of the beat frequency of the interference light beam is from 200 MHz to 400 MHz. With such a high frequency component, there is a concern that a sufficient signal level cannot be obtained or a change in the signal level cannot be detected with sufficient accuracy depending on a type of a fluorescent substance to be excited or an operating band of the PMT 57 or the like. Thus, by shifting the entire frequency range of the beat frequency of the interference light beam to a low frequency region by the AOFS 91 as described above, lowering the signal level is avoided, and the change in the signal level can be detected with sufficient accuracy.

The first and second laser beams Ba and Bb pass through the anamorphic prism pair 92, respectively, and the beam shape is expanded in a lateral direction (a diffraction direction by the AOD 95) and then, enter an incident surface of the AOD 95 via the relay optical system 94 made of the lenses 94a and 94b at positive and negative incidence angles, different from each other. The λ/2 plate 93 is disposed on an optical path of the first laser beam Ba between the anamorphic prism pair 92 and the relay optical system 94, and the first laser beam Ba has its polarization direction rotated by 90 degrees by being transmitted through the λ/2 plate 93. The polarization direction of the second laser beam Bb may be rotated by 90 degrees instead of the first laser beam Ba. Moreover, the relay optical system 94 is adjusted so that its front-side focal position is matched with an output surface of the AOFS 91 and its rear-side focal position with an incident surface of the AOD 95.

The AOD 95 functions as the first AOD for generating the plurality of first diffracted light beams from the laser beam and the second AOD for generating the plurality of second diffracted light beams from the laser beam. Into the AOD 95, a comb signal in which N pieces of the driving signals with a constant frequency interval Δf are superposed is input. By means of this AOD 95, the plurality of first diffracted light beams are generated from the incident first laser beam Ba, and the plurality of second diffracted light beams are generated from the second laser beam Bb. Since the first and second laser beams Ba and Bb are incident to the AOD at positive and negative incidence angles, opposite to each other, positive/negative of the frequency shift of the first diffracted light beam and the second diffracted light beam output from the AOD 95 becomes opposite to each other. Here, since the second diffracted light beam is frequency-shifted by the AOFS 91 and the AOD 95 with respect to the frequency of the original laser beam in the end, the frequency shift by the AOFS 91 is preferably set to twice of the lowest frequency component of the comb signal driving the AOD 95. Moreover, sizes of the incidence angles of the first and second laser beams to the AOD 95 are preferably set to equal in order to improve the generation efficiency of the interference light beam.

The plurality of first diffracted light beams and the plurality of second diffracted light beams generated by the AOD 95 as above enter the Wollaston prism 97 as a superposition unit from directions different from each other via the relay optical system 96 made of the lenses 96a and 96b. The relay optical system 96 is adjusted so that its front-side focal position is matched with an output surface of the AOD 95 and its rear-side focal position matched with the Wollaston prism 97.

Here, the first and second diffracted light beams output from the AOD 95 have polarization orthogonal to each other in order to keep polarization states of the original first laser beam Ba and second laser beam Bb, respectively. Since the first and second diffracted light beams enter the Wollaston prism 97 via the relay optical system 96, combined light in which diffracted light beams with different frequencies, that is, the first diffracted light beam and the second diffracted light beam are combined, that is, superposed light is output from the Wollaston prism 97.

On an optical path of the combined light from the Wollaston prism 97, a polarizer 98 transmitting only 45-degree linear polarized light is disposed. When the combined light from the Wollaston prism 97 enters the polarizer 98, only the interference light beam which becomes the 45-degree linear polarized light from the combined light is transmitted through the polarizer 98. As a result, a plurality of interference light beams equal to the interference light beam output from the beam splitter 19 in the aforementioned first embodiment are generated. The plurality of interference light beams are sent to the interference light irradiation unit via the anamorphic prism pair or the like (not shown) which makes the beam shape circular by extending it in a short axis direction.

A zero-order component of the first laser beam Ba transmitted without diffraction from the AOD 95 is coaxially superposed on a part of the second diffracted light beam, but since the zero-order component of the first laser beam Ba has polarized light orthogonal to the superposed second diffracted light beam, it is output from the Wollaston prism 97 in a direction different from that of the combined light and can be ignored. Similarly, the zero-order component of the second laser beam Bb transmitted without diffraction from the AOD 95 is coaxially superposed on a part of the first diffracted light beam but since their polarized light beams are orthogonal to each other, the zero-order component of the second laser beam Bb is output from the Wollaston prism 97 in a direction different from that of the combined light and can be ignored.

As described above, the plurality of first and second diffracted light beams can be generated, respectively, by using one AOD 95 in this example, and the plurality of interference light beams can be generated, and the number of components for generating the first and second diffracted light beams can be reduced.

It is also possible to generate the plurality of first diffracted light beams and the plurality of second diffracted light beams by using one AOD by another method. The first laser beam enters from one of the surfaces of the AOD and the plurality of first diffracted light beams are output from the other surface, and the second laser beam enters from the other surface of the AOD and the plurality of second diffracted light beams are output from the one surface, for example. With this method, too, the first and second diffracted light beams can be generated by one AOD, whereby the number of components can be reduced.

Figure 13:
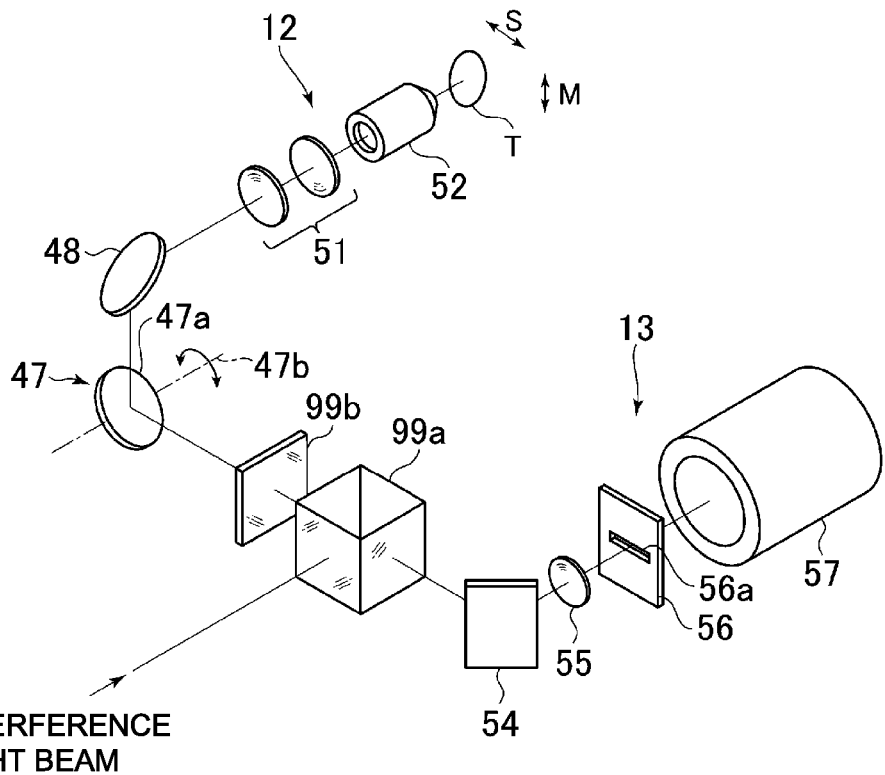
FIG. 13 is an explanatory view illustrating an example of detection of reflected light which is interference light beam reflected from the sample.

In each of the aforementioned embodiments, fluorescence from the sample T is detected, but this is not limiting. The interference light beam transmitted through or the interference light beam reflected (or backscattered) by the sample T may be detected. When the reflected light is to be detected, the polarization beam splitter 99a and the ¼ wavelength plate 99b only need to be used as illustrated in FIG. 13, for example, instead of the dichroic mirror for separating the interference light beam and the detection light from each other. The ¼ wavelength plate 99b is arranged on the interference light irradiation unit 12 side of the polarization beam splitter 99a. As a result, the reflected light incident to the polarization beam splitter 99a has the polarization direction rotated by 90 degrees with respect to the interference light beam from the interference light generation unit and is transmitted through the polarization beam splitter 99a toward the light detection unit 13. Moreover, since the interference light beam has a wavelength basically different from that of the fluorescence, the transmitted light and the reflection light as well as the fluorescence may be detected by separate detectors at the same time similarly to the third embodiment.

In each of the aforementioned embodiments, a plurality of first and second diffracted light beams with frequencies different from each other are generated by using the AOD, and the plurality of interference light beams are generated from them, but generation of the plurality of interference light beams is not limited to that.

Figure 14:
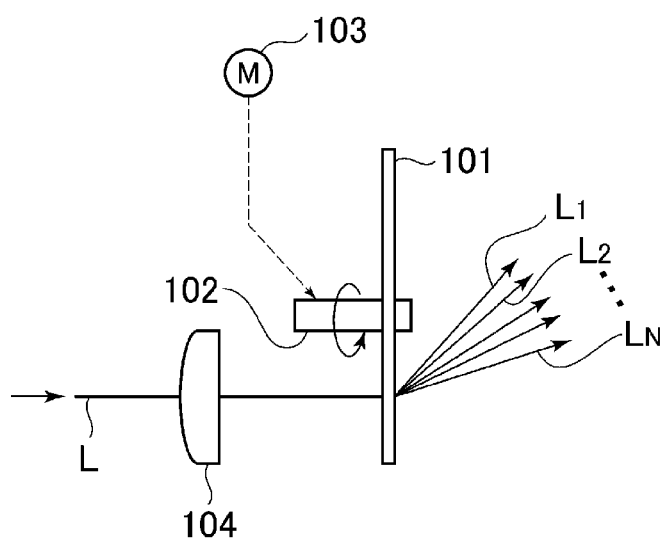
FIG. 14 is an explanatory view illustrating an example of generating diffracted light beam with a different frequency by using a modulation disk.

FIG. 14 illustrates an example of generating a plurality of diffracted light beams $L_1, L_2 \ldots L_N$ with different frequencies by using a modulation disk 101 with a predetermined transmissivity or a phase pattern formed on a surface thereof. The modulation disk 101 has its center shaft 102 mounted on a motor 103 and is rotated by the motor 103 at a high speed. By irradiating this rotating modulation disk 101 with a laser beam L from one of its surfaces via a cylindrical lens 104, the diffracted light beams $L_1, L_2 \ldots L_N$ are output from the other surface of the modulation disk 101.

Figure 15:
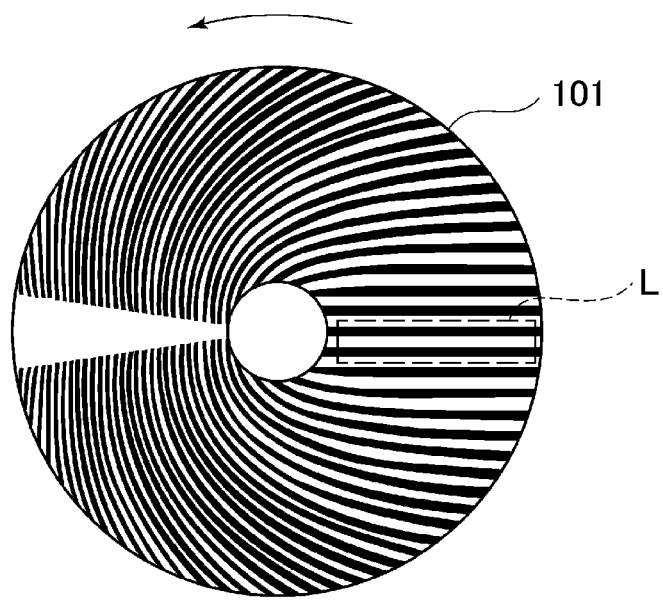
FIG. 15 is an explanatory view schematically illustrating a pattern of the modulation disk.

As illustrated in FIG. 15, by irradiating the laser beam L via the cylindrical lens 104, the modulation disk 101 is irradiated with the laser beam L linearly along its radial direction. Moreover, the modulation disk 101 has a pattern of a deformed striped pattern, and a stripe cycle is set to slightly longer than a wavelength of the irradiated laser beam. As a result, the diffracted light beams $L_1, L_2 \ldots L_N$ of first-order diffraction are output without superposing the other diffracted light beams from each position in an irradiation region of the laser beam L on the modulation disk 101. Moreover, since the cycle of the stripes on the modulation disk 101 is different in the radial direction of the modulation disk 101, frequency shift amounts of the diffracted light beams $L_1, L_2 \ldots L_N$ are different along the radial direction of the modulation disk 101. As a result, similarly to the aforementioned embodiments, the plurality of diffracted light beams as the first light beam or the second light beam having substantially the same property as that of the diffracted light beam generated from the AOD. Details of such modulation disk 101 are described in the following documents 1, 2 and the like.

Document 1: JEFFREY J. FIELD, DAVID G. WINTERS, AND RANDY A. BARTELS, J. Opt. Soc. A 32(11) 2156 (2015).

Document 2: Jeffrey S. Sanders, Ronald G. Driggers, Carl E. Halford, and Steven T. Griffin, Opt. Eng. 30 (11), 1720-1724 (1991).

The generation of the interference light beam only needs to be carried out by using the configuration using the modulation disk 101 in FIG. 14 instead of the first AOD 24 and the second AOD 34 in the first embodiment illustrated in FIG. 1, for example, respectively, by using a diffracted light beam portion with a large frequency shift amount generated from one of the modulation disks 101 as the first diffracted light beam and a diffracted light beam portion with a small frequency shift amount generated from the other modulation disk 101 as the second diffracted light beam, and by superposing them. It is needless to say that the patterns of two pieces of the modulation disks 101 may be different from each other so that the frequencies of the diffracted light beam obtained by the modulation disks 101 are different.

Example

The sample T was observed by using the configuration similar to the laser microscope system 10 in FIG. 1. In this observation, in the laser microscope system 10, the same AOD operable by a driving signal from 102 MHz to 201 MHz as the first AOD 24 and the second AOD 34 was used. Moreover, the first AOD 24 was driven by the first comb signal in which driving signals between 102 MHz and 201 MHz with the frequency interval Δf of 1 MHz are superposed. The second AOD 34 was also driven by the second comb signal in which driving signal between 102 MH and 201 MHz with the frequency interval Δf of 1 MHz are superposed. The first comb signal and the second comb signal were set as set values of phases between the frequency components so that the crosstalk was cancelled in accordance with the formula described above, which was φa=φb=0, φ=3.3°.

Moreover, by making positive/negative of the incidence angle of the first and second laser beams with respect to the first and second AODs 24 and 34 opposite to each other, the frequency range of the plurality of first diffracted light beams were not overlapped with the frequency range of the plurality of second diffracted light beams, but in order to lower the beat frequency of the interference light beam to a low frequency region, the second laser beam a frequency of which was raised by the AOFS 32 enters the second AOD 34. In this AOFS 32, the frequency shift amount of the second laser beam was set to "+200 MHz" by driving with a shift signal of the frequency of 200 MHz. 100 beams of interference light with different beat frequencies were generated such that the first diffracted light beam and the second diffracted light beam can be combined in ascending order of frequency for the first diffracted light beams and in descending order of frequency for the second diffracted light beams. The first and second AODs 24 and 34 have operation bands of 100 to 200 MHz, but since the operation band of the AOD is specified by a frequency at which diffraction efficiency is −3 dB of a maximum value and thus, they are sufficiently operated even if they are excited by a frequency slightly shifted from the operation band.

Figure 16:
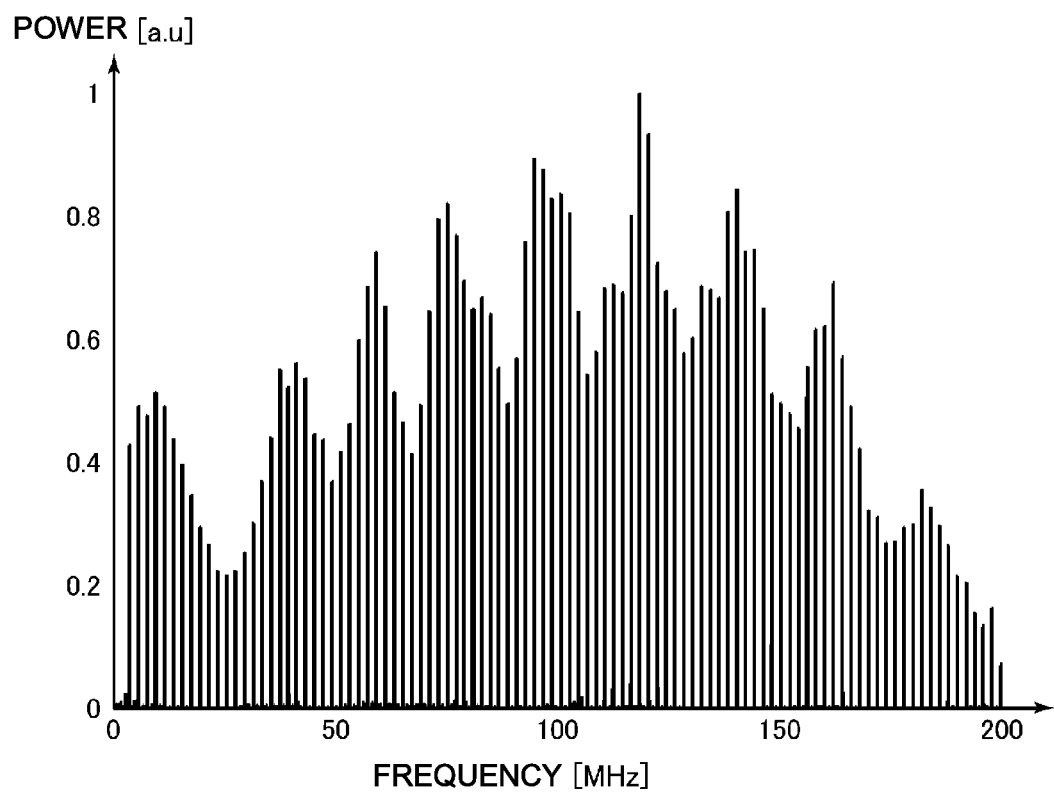
FIG. 16 is a graph illustrating a frequency spectrum of interference light beam in an example.
Figure 17:
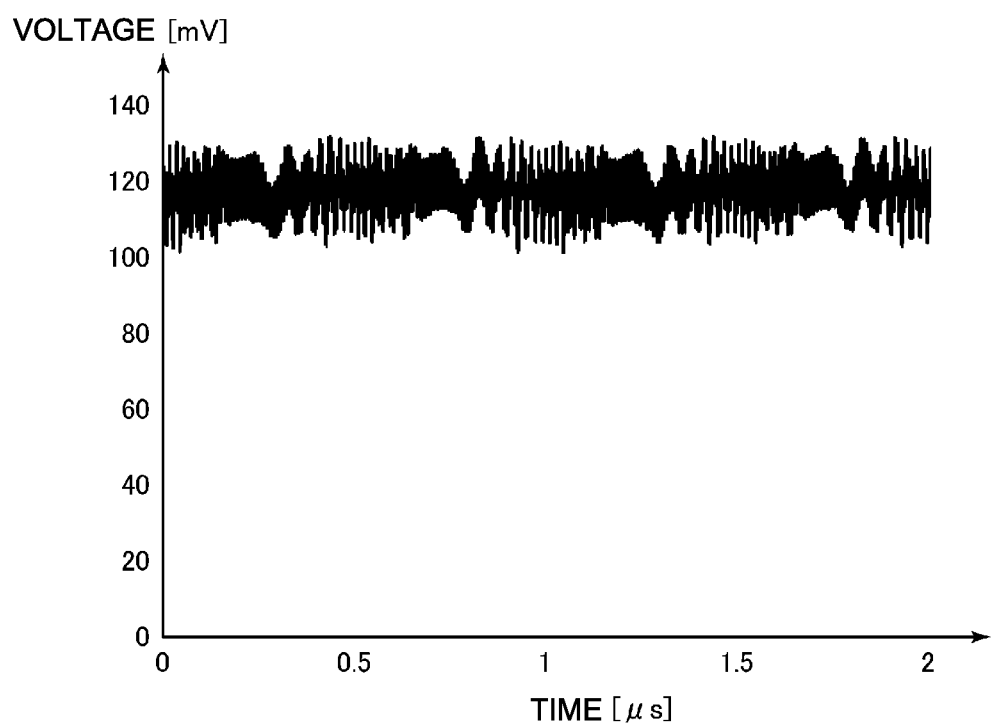
FIG. 17 is a graph illustrating a signal waveform obtained by Fourier transform of the frequency spectrum in FIG. 16.

A frequency spectrum obtained by measuring the plurality of interference light beams generated from the first diffracted light beam and the second diffracted light beam from the first and second AODs 24 and 34 driven as above and output from the objective lens 52 is illustrated in FIG. 16. From the frequency spectrum, it can be confirmed that 100 beams of interference light from 4 MHz to 202 MHz with the beat frequency at a 2-MHz interval were formed, and it was found that a bandwidth of 200 MHz could be obtained. Moreover, by performing Fourier transformation on the aforementioned frequency spectrum, a signal waveform as illustrated in FIG. 17 was obtained. It was found that this signal waveform had amplitude of approximately 70% of an ideal signal waveform when the first diffracted light beam and the second diffracted light beam to be superposed were completely superposed, and the generation efficiency of the interference light beam was approximately 70%.

Figure 18:
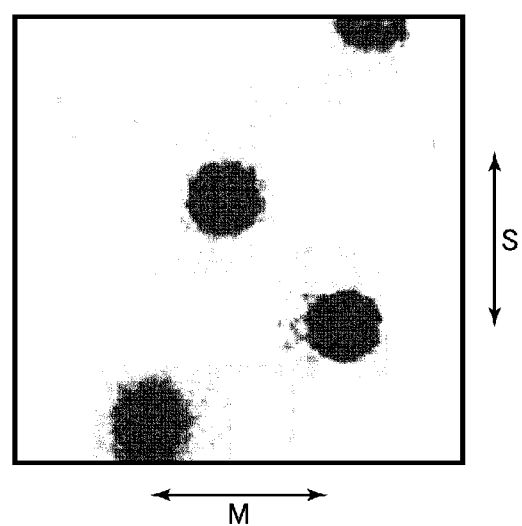
FIG. 18 is an observation image obtained in the example.

By oscillating a frame rate, that is, the scanning mirror 47a at 16 KHz, fluorescence beads with an average diameter of 6 μm was detected as the sample T. An observation image obtained from this detection is illustrated in FIG. 18. The observation image in FIG. 18 has a lateral direction as the main scanning direction (M) in which the irradiation spots SP are aligned and a longitudinal direction as the sub scanning direction (S) in which the irradiation spot SP is moved.

REFERENCE SIGNS LIST 10 laser microscope system
11 interference light generation unit
12 interference light irradiation unit
13 light detection unit
14 signal processing unit
19 beam splitter
24, 34, 95 AOD
32, 91 AOFS
97 Wollaston prism
SP irradiation spot
T sample

The invention claimed is:

1. A laser microscope system comprising:
an interference light generation unit configured to generate a plurality of interference light beams with different beat frequencies by causing a plurality of first light beams with different frequencies and a plurality of second light beams with different frequencies to interfere with each other by different combinations of frequency differences between the plurality of first light beams and the plurality of second light beams;
an interference light irradiation unit configured to emit the plurality of interference light beams; and
a photodetector for detecting detection light from a sample irradiated with the plurality of interference light beams.

2. The laser microscope system according to claim 1, wherein
the interference light generation unit comprises:
a first acousto-optic deflector configured to receive input of a first comb signal and diffract light emitted from a laser light source to output, as the plurality of first light beams, a plurality of first diffracted light beams according to a frequency of the first comb signal; and
a second acousto-optic deflector configured to receive input of a second comb signal and diffract the light emitted from the laser light source to output, as the plurality of second light beams, a plurality of second diffracted light beams according to a frequency of the second comb signal.

3. The laser microscope system according to claim 2, further comprising:
an acousto-optic frequency shifter configured to convert a frequency of the light emitted from the laser light source to obtain frequency-converted light and to output the frequency-converted light, wherein
the second acousto-optic deflector is configured to receive and diffract the frequency-converted light.

4. The laser microscope system according to claim 2, wherein
the first comb signal has a first comb component and the second comb signal has a second comb component, a phase of the first comb component and a phase of the second comb component being set to suppress a crosstalk component caused by interference between a first light beam of the plurality of first light beams and a second light beam of the plurality of second light beams, the first light beam and the second light beam being located at adjacent or separate positions.

5. The laser microscope system according to claim 1, wherein
the interference light generation unit comprises an acousto-optic deflector configured to receive input of comb signals and diffract beams of light incident at positive and negative incidence angles to output, as the plurality of first light beams and the plurality of second light beams, a plurality of first diffracted light beams and a plurality of second diffracted light beams according to frequencies of the comb signals.

6. The laser microscope system according to claim 5, further comprising:
an acousto-optic frequency shifter configured to: receive incident light from a laser light source;
diffract the incident light and convert a frequency of the incident light to obtain converted light; and
output transmitted light of a transmitted component of the incident light and output the converted light, wherein the acousto-optic deflector is configured to receive, as the beams of light, the transmitted light and the converted light at the positive and negative incidence angles.

7. The laser microscope system according to claim 1, wherein
a first frequency range of the plurality of first light beams is different from a second frequency range of the plurality of second light beams; and
the interference light generation unit is configured to generate the plurality of interference light beams by combining a first light beam selected from the plurality of first light beams in ascending order of frequency with a second light beam selected from the plurality of second light beams in descending order of frequency.

8. The laser microscope system according to claim 1, wherein
a first frequency range of the plurality of first light beams and a second frequency range of the plurality of second light beams are not overlapped with each other.

9. The laser microscope system according to claim 1, wherein
the interference light irradiation unit is configured to emit the plurality of interference light beams to form irradiation spots aligned linearly.

10. The laser microscope system according to claim 1, wherein
the interference light generation unit is configured to adjust a shift in one direction between the plurality of first light beams and the plurality of second light beams by a half of a specified alignment pitch, and
the interference light irradiation unit is configured to linearly align first spots of the plurality of first light beams at the specified alignment pitch and second spots of the plurality of second light beams at the specified alignment pitch in the one direction-such that the second spots are shifted by the half of the specified alignment pitch with respect to the first spots to form irradiation spots of the plurality of interference light beams where the first spots and the second spots are overlapped with each other.

11. The laser microscope system according to claim 1, comprising:
a scanning unit for relatively moving the irradiation spots of the plurality of interference light beams and the sample in a direction crossing an alignment direction of the irradiation spots of the plurality of interference light beams.

12. The laser microscope system according to claim 11, wherein
the scanning unit is a flow cell having a channel through which the sample is configured to flow along with fluid; and
the interference light irradiation unit is configured to align the irradiation spots in the channel in a direction crossing a flow direction of the sample.

13. The laser microscope system according to claim 1, comprising:
a wavelength separation unit for separating the detection light from the sample into two or more wavelength components according to wavelengths; and
two or more photodetectors, each being defined as the photodetector, the two or more photodetectors being provided for the two or more wavelength components, respectively, obtained by the wavelength separation unit.

14. A laser microscope detection method comprising:
generating a plurality of first light beams with different frequencies and a plurality of second light beams with different frequencies;
generating a plurality of interference light beams with different beat frequencies by causing the plurality of first light beams and the plurality of second light beams to interfere with each other;
irradiating a sample with the plurality of interference light beams; and
detecting detection light from the sample irradiated with the plurality of interference light beams.

15. The laser microscope detection method according to claim 14, wherein
a first frequency range of the plurality of first light beams and a second frequency range of the plurality of second light beams are different; and
generating of the plurality of interference light beams includes combining a first light beam selected from the plurality of first light beams in ascending order of frequency with a second light beam selected from the plurality of second light beams in descending order of frequency, thereby generating the plurality of interference light beams.

16. The laser microscope detection method according to claim 14, wherein
generating of the plurality of first light beams and the plurality of second light beams includes:
inputting a beam of light emitted from a laser light source and inputting a first comb signal, into a first acousto-optic deflector;
diffracting, by the first acousto-optic deflector, the beam of light to generate, as the plurality of first light beams, a plurality of first diffracted light beams according to a frequency of the first comb signal;
inputting the beam of light emitted from the laser light source and inputting a second comb signal, into a second acousto-optic deflector; and
diffracting, by the second acousto-optic deflector, the beam of light to generate, as the plurality of second light beams, a plurality of second diffracted light beams according to a frequency of the second comb signal.

17. The laser microscope detection method according to claim 16, wherein
the first comb signal has a first comb component and the second comb signal has a second comb component, a phase of the first comb component and a phase of the second comb component being set to suppress a cross talk component caused by interference between a first light beam of the plurality of first light beams and a second light beam of the plurality of second light beams, the first light beam and the second light beam being formed at adjacent or separate positions.

18. The laser microscope detection method according to claim 14, wherein
generating of the plurality of first light beams and the plurality of second light beams includes:
inputting beams of light incident at positive and negative incidence angles and inputting comb signals into an acoustic-optic deflector; and
diffracting the beams of light, by the acoustic-optic deflector, to output, as the plurality of first light beams and the plurality of second light beams, a plurality of first diffracted light beams and a plurality of second diffracted light beams according to frequencies of the comb signals.

* * * * *